US011968975B2

(12) United States Patent
Jones et al.

(10) Patent No.: US 11,968,975 B2
(45) Date of Patent: Apr. 30, 2024

(54) COMPOSITIONS AND METHODS FOR STORING LIQUID BIOSPECIMENS

(71) Applicant: Regents of the University of Minnesota, Minneapolis, MN (US)

(72) Inventors: Bryan Jones, Columbia Heights, MN (US); Alptekin Aksan, Minneapolis, MN (US); Advitiya Mahajan, Falcon Heights, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 711 days.

(21) Appl. No.: 16/860,894

(22) Filed: Apr. 28, 2020

(65) Prior Publication Data

US 2020/0345000 A1 Nov. 5, 2020

Related U.S. Application Data

(60) Provisional application No. 62/840,622, filed on Apr. 30, 2019.

(51) Int. Cl.
*A01N 1/02* (2006.01)

(52) U.S. Cl.
CPC .......... *A01N 1/0231* (2013.01); *A01N 1/0284* (2013.01)

(58) Field of Classification Search
CPC ............................ A01N 1/0284; A01N 1/0231
See application file for complete search history.

(56) References Cited

U.S. PATENT DOCUMENTS

| | | | |
|---|---|---|---|
| 4,559,298 A | 12/1985 | Fahy | |
| 5,336,616 A | 8/1994 | Livesey | |
| 5,756,126 A | 5/1998 | Burgoyne | |
| 5,955,448 A * | 9/1999 | Colaco ................. | A61K 31/155 514/400 |
| 5,976,572 A | 11/1999 | Burgoyne | |
| 6,294,203 B1 | 9/2001 | Burgoyne | |
| 6,391,224 B1 | 5/2002 | Wowk | |
| 6,395,467 B1 | 5/2002 | Wowk | |
| 6,627,226 B2 | 9/2003 | Burgoyne | |
| 6,753,454 B1 | 6/2004 | Smith | |
| 6,821,479 B1 | 11/2004 | Smith | |
| 6,881,543 B2 | 4/2005 | Philpott | |
| 7,142,987 B2 | 11/2006 | Eggers | |
| 7,278,278 B2 | 10/2007 | Wowk | |
| D574,505 S | 8/2008 | Muller-Cohn | |
| 7,482,116 B2 | 1/2009 | Birnboim | |
| 7,498,133 B2 | 3/2009 | Fomovskaia | |
| 7,589,184 B2 | 9/2009 | Hogan | |
| 8,080,645 B2 | 12/2011 | Fischer | |
| 8,084,443 B2 | 12/2011 | Fischer | |
| 8,158,357 B2 | 4/2012 | Birnboim | |
| 8,183,233 B2 | 5/2012 | Kipp | |
| 8,221,381 B2 | 7/2012 | Muir | |
| 8,283,165 B2 | 10/2012 | Hogan | |
| 8,293,467 B2 | 10/2012 | Fischer | |
| 8,394,642 B2 | 3/2013 | Jovanovich | |
| 8,435,943 B2 | 5/2013 | Garigapati | |
| 8,679,735 B2 | 3/2014 | Fahy | |
| 9,399,082 B2 | 7/2016 | Bowlin | |
| 2002/0051963 A1 | 5/2002 | Bronshtein | |
| 2004/0077708 A1 | 4/2004 | Grahek | |
| 2009/0130756 A1 | 5/2009 | Klann | |
| 2009/0291427 A1 | 11/2009 | Muller-Cohn | |
| 2009/0298132 A1 | 12/2009 | Muller-Cohn | |
| 2009/0312285 A1 | 12/2009 | Fischer | |
| 2010/0099149 A1 | 4/2010 | Birnboim | |
| 2010/0159012 A1 * | 6/2010 | Domb ..................... | A61K 47/61 536/112 |
| 2010/0167376 A1 | 7/2010 | Hogan | |
| 2010/0173392 A1 | 7/2010 | Davis | |
| 2010/0178210 A1 | 7/2010 | Hogan | |
| 2010/0209957 A1 | 8/2010 | Hogan | |
| 2010/0218623 A1 | 9/2010 | Eggers | |

(Continued)

FOREIGN PATENT DOCUMENTS

| | | |
|---|---|---|
| EP | 1032647 A1 | 9/2000 |
| EP | 2195466 B1 | 10/2012 |

(Continued)

OTHER PUBLICATIONS

Schrohl et al ("Banking of Biological Fluids for Studies of Disease-associated Protein Biomarkers," Molecular & Cellular Proteomics 7: 2061-2066, 2008) (Year: 2008).*
TdB Labs. dextran product sheet "What is dextran?" 2021 [retrieved on Oct. 4, 2022] retrieved from the internet: <URL:https://tdblabs.se/applications/what-is-dextran/> (Year: 2021).*
Kipp et al (MX 2010/012451) English language machine translation (Year: 2010).*
Aksan, "Analysis of desiccation and vitrification characteristics of carbohydrate films by shear-wave resonators" 2005 Langmuir, 21(7):2847-54.
Aksan, "Desiccation kinetics of biopreservation solutions in microchannels" 2006 Journal of Applied Physics, 99:064703.

(Continued)

*Primary Examiner* — Emily A Cordas
(74) *Attorney, Agent, or Firm* — Mueting Raasch Group

(57) ABSTRACT

A lyoprotectant composition includes one or more lyoprotective carbohydrates comprising a non-reducing polysaccharide. The non-reducing polysaccharide may be dextranol. The one or more lyoprotective carbohydrates may include a non-reducing disaccharide. The lyoprotectant composition may be free of or substantially free of reducing sugars. The composition may be in the form of a matrix including a non-woven web of fibers having an average diameter of 0.1 µm to 2.5 µm. A method of storing a liquid biospecimen includes mixing the liquid biospecimen with the lyoprotectant composition to prepare a specimen-loaded composition; drying the specimen-loaded composition; and storing the dried specimen-loaded composition.

20 Claims, 6 Drawing Sheets

(56) References Cited

U.S. PATENT DOCUMENTS

| | | | |
|---|---|---|---|
| 2010/0248363 A1* | 9/2010 | Hogan | C07H 21/02 536/23.1 |
| 2010/0273218 A1 | 10/2010 | Birnboim | |
| 2011/0005932 A1 | 1/2011 | Jovanovich | |
| 2011/0014658 A1 | 1/2011 | Birnboim | |
| 2011/0081363 A1 | 4/2011 | Whitney | |
| 2011/0281754 A1 | 11/2011 | Fischer | |
| 2012/0052572 A1 | 3/2012 | Whitney | |
| 2012/0061392 A1 | 3/2012 | Beach | |
| 2012/0088231 A1 | 4/2012 | Fischer | |
| 2012/0100522 A1 | 4/2012 | Saghbini | |
| 2012/0100529 A1 | 4/2012 | Fischer | |
| 2012/0138862 A1 | 6/2012 | Hogan | |
| 2012/0308987 A1 | 12/2012 | Hogan | |
| 2012/0315635 A1 | 12/2012 | Vangbo | |
| 2013/0025691 A1 | 1/2013 | Muir | |
| 2013/0040288 A1 | 2/2013 | Fischer | |
| 2015/0176056 A1 | 6/2015 | Li et al. | |
| 2015/0320031 A1* | 11/2015 | Andreasen | A01N 1/0221 435/1.3 |
| 2016/0298077 A1* | 10/2016 | Salmons | A61P 31/00 |
| 2017/0135333 A1 | 5/2017 | Aksan et al. | |
| 2019/0048421 A1* | 2/2019 | Kim | G16B 25/20 |

FOREIGN PATENT DOCUMENTS

| | | | | |
|---|---|---|---|---|
| EP | 2505213 A2 | | 10/2012 | |
| MX | 2010012451 A1 | * | 12/2010 | A61K 47/36 |
| WO | WO 1999/027071 A1 | | 6/1999 | |
| WO | WO 2006/090150 A1 | | 8/2006 | |
| WO | WO 2010/042647 A2 | | 4/2010 | |

OTHER PUBLICATIONS

Aksan, "Isothermal desiccation and vitrification kinetics of trehalose-dextran solutions" 2004 Langmuir, 20(13):5521-9.

Aksan, "Roles of Thermodynamic State and Molecular Mobility in Biopreservation" in the Biomedical Engineering Handbook, J.D. Bronzino, Editor. Taylor & Francis: Boca Raton, 2006. Cover page, publisher's page. and pp. 41.1- 41.20.

Anchordoquy, "Polymers protect lactate dehydrogenase during freeze-drying by inhibiting dissociation in the frozen state" Aug. 1996 Archives of Biochemistry and Biophysics, 332(2):231-238.

Anchordoquy, "Maintenance of quaternary structure in the frozen state stabilizes lactate dehydrogenase during freeze-drying" 2001 Archives of Biochemistry and Biophysics, 390(1):35-41.

Andersen, "Identification of candidate biomarkers in ovarian cancer serum by depletion of highly abundant proteins and differential in-gel electrophoresis" Dec. 2010 Electrophoresis, 31(4):599-610.

Anderson, "The human plasma proteome: history, character, and diagnostic prospects" Nov. 2002 Mol Cell Proteomics, 1(11):845-67.

Angell, "Liquid Fragility and the Glass Transition in Water and Aqueous Solutions" 2002 Chemical Reviews, 102(8):2627-2650.

Arakawa, "Preferential interactions of proteins with salts in concentrated solutions" Dec. 1982 Biochemistry, 21(25):6545-6552.

Arakawa, "Protection of bovine serum albumin from aggregation by tween 80" May 2000 Journal of Pharmaceutical Sciences, 89(5):646-651.

Armstrong, "Serum lactate dehydrogenase (LDH) as a biomarker for survival with mTor inhibition in patients with metastatic renal cell carcinoma (RCC)" May 2010 Journal of Clinical Oncology, 28(15).

Atochina-Vasserman, "Alterations in Multimeric Structure of Surfactant Protein D as a Biomarker for Lung Injury and Inflammation in Humans" 2010 American Journal of Respiratory and Critical Care Medicine, 181.

Aziz, "Analytical performance of a highly sensitive C-reactive protein-based immunoassay and the effects of laboratory variables on levels of protein in blood" Jul. 2003 Clin Diagn Lab Immunol, 10(4):652-7.

Bakaltcheva, "Freeze-dried whole plasma: Evaluating sucrose, trehalose, sorbitol, mannitol and glycine as stabilizers" 2007 Elsevier health journals, 105-116.

Bhatnagar, "Post-thaw aging affects activity of lactate dehydrogenase" Jun. 2005 J Pharm Sci, 94(6):1382-8.

Bhatnagar, "Protein stability during freezing: Separation of stresses and mechanisms of protein stabilization" 2007 Pharmaceutical Develop. and Tech., 12(5):505-523.

Bosca, "Modulation of muscle phosphofructokinase at physiological concentration of enzyme" Feb. 1985 J Biol Chem, 260(4):2100-7.

Cao, "Effect of freezing and thawing rates on denaturation of proteins in aqueous solutions" Jun. 2003 Biotechnol Bioeng, 82(6):684-90.

Carpenter, "Separation of freezing- and drying-induced denaturation of lyophilized proteins using stress-specific stabilization. I. Enzyme activity and calorimetric studies" Jun. 1993 Arch Biochem Biophys, 303(2):456-64.

Cataland, "Biomarkers of terminal complement activation confirm the diagnosis of aHUS and differentiate aHUS from TTP" Jun. 2014 Blood, 123(24):3733-8.

Chaigneau, "Serum biobank certification and the establishment of quality controls for biological fluids: examples of serum biomarker stability after temperature variation" 2007 Clin Chem Lab Med 45 (2007):1390-5.

Cicchillitti, "Characterisation of a multimeric protein complex associated with ERp57 within the nucleus in paclitaxel-sensitive and -resistant epithelial ovarian cancer cells: The involvement of specific conformational states of beta-actin" 2010 International Journal of Oncology, 37(2):445-454.

Cicerone, "Fast dynamics and stabilization of proteins: binary glasses of trehalose and glycerol" 2004 Biophys J, 86(6):3836-45.

Cicerone, "Substantially Improved Stability of Biological Agents in Dried Form" 2003 Bioprocess International, 36-47.

Cohen, "Ice-induced partial unfolding and aggregation of an integral membrane protein" Nov. 2010 Biochimica Et Biophysica Acta-Biomembranes, 1798(11):2040-2047.

Costantino, "Aggregation of a lyophilized pharmaceutical protein, recombinant human albumin: effect of moisture and stabilization by excipients" May 1995 Biotechnology (NY), 13(5):493-6.

Dai et al., "Electrospun water-soluble polymer nanofibers for the dehydration and storage of sensitive reagents," *Nanotechnology* 2014; 25:225101. 8 pages.

Dalkin, "Derivation and Application of Upper Limits for Prostate-Specific Antigen in Men Aged 50-74 Years with No Clinical-Evidence of Prostatic-Carcinoma" 1995 British Journal of Urology, 76(3):346-350.

DNAgard® Blood, [online]; 2018 Biomatrica, Inc. [retrieved on Jan. 23, 2018]. Retrieved from the Internet: <URL:http://biomatrica.com/dnagardblood.php>; 1 page.

El Demery, "Serum Matrix Metalloproteinase-7 is an independent prognostic biomarker in advanced bladder cancer" 2014 Clin Transl Med, 3:31.

Engwegen, "Influence of variations in sample handling on SELDI-TOF MS serum protein profiles for colorectal cancer" 2008 Proteomics Clin Appl, 2(6):936-45.

Fahy, "Vitrification as an approach to cryopreservation" Aug. 1984 Cryobiology, 21(4):407-26.

Farruggia, "Thermal features of the bovine serum albumin unfolding by polyethylene glycols" Oct. 1999 Int J Biol Macromol, 26(1):23-33.

GenTegra® Products, [online]; 2017 Gentegra LLC [retrieved on Feb. 1, 2018]. Retrieved from the Internet: <URL:http://www.gentegra.com/products/>; 8 pages.

Girg, "The dimeric intermediate on the pathway of reconstitution of lactate dehydrogenase is enzymatically active" Oct. 1983 FEBS Lett, 163(1):132-5.

Gogas, "Biomarkers in melanoma" 2009 Ann Oncol, 20 Suppl 6:vi8-13.

Greiff, "Cryotolerance of enzymes. I. Freezing of lactic dehydrogenase" 1966 Cryobiology, 2(6):335-41.

(56) References Cited

OTHER PUBLICATIONS

Habermann, "Increased serum levels of complement C3a anaphylatoxin indicate the presence of colorectal tumors" 2006 Gastroenterology, 131(4):1020-9; quiz 1284.
Hancock, "Molecular Mobility of Amorphous Pharmaceutical Solids Below Their Glass Transition Temperatures" Jun. 1995 Pharmacological Research, 12(1995):799-806.
Hatley, "The Cold-Induced Denaturation of Lactate-Dehydrogenase at Sub-Zero Temperatures in the Absence of Perturbants" 1989 Febs Letters, 257(1):171-173.
Hsieh, "Systematical evaluation of the effects of sample collection procedures on low-molecular-weight serum/plasma proteome profiling" May 2006 Proteomics, 6(10):3189-98.
Ikeda, "Evaluation of the short-term stability of specimens for clinical laboratory testing" 2015 Biopreserv Biobank, 13(2):135-43.
Imamura, "Water sorption and glass transition behaviors of freeze-dried sucrosedextran mixtures" 2002 Pharmaceutical Research, 2175-2181.
Insenser, "Impact of the storage temperature on human plasma proteomic analysis: Implications for the use of human plasma collections in research" 2010 Proteomics Clin. Appl (2010) 739-744.
Iqbal, "Pyruvate kinase M2 and cancer: an updated assessment" 2014 FEBS Lett, 588(16):2685-92.
Jones, "Dehydration of trehalose dihydrate at low relative humidity and ambient temperature" 2006 International journal of pharmaceutics (2006):87-98.
Jones et al., "Dextranol: A better lyoprotectant," bioRxiv, published online Dec. 7, 2018, 29 pages.
Kamlage, "Quality markers addressing preanalytical variations of blood and plasma processing identified by broad and targeted metabolite profiling" 2014 Clin Chem, 60(2):399-412.
Kerwin, "Polysorbates 20 and 80 used in the formulation of protein biotherapeutics: structure and degradation pathways" 2008 J Pharm Sci, 97(8):2924-35.
Kisand, "Impact of cryopreservation on serum concentration of matrix metalloproteinases (MMP)-7, TIMP-1, vascular growth factors (VEGF) and VEGF-R2 in Biobank samples" 2011 Clin Chem Lab Med, 49(2):229-35.
Kubrak, "Comparative characteristics of lactate dehydrogenase from the liver and white muscles of common carp (Cyprinus carpio)" 2008 Ukr Biokhim Zh 80(4):35-41. Abstract only/.
Lee, "Proteomic analysis of the effect of storage temperature on human serum" 2010 Ann Clin Lab Sci, 40(1):61-70.
Lengelle, "Soluble CD40 ligand as a biomarker for storage-related preanalytic variations of human serum" 2008 Cytokine, 44(2):275-82.
Less, "Isothermal vitrification methodology development for non-cryogenic storage of archival human sera" Jan. 2013 Cryobio., 66(2):176-185.
Lopez, "Mechanistic elements of protein cold denaturation" 2008 Journal of Physical Chemistry B, 112(19):5961-5967.
Ludwig, "Biomarkers in cancer staging, prognosis and treatment selection" 2005 Nat Rev Cancer, 5(11):845-56.
Magazu, "Dynamics of glass-forming bioprotectant systems" Jan. 2011 Journal of Non-Crystalline Solids, 691-694.
Malsam, "Hydrogen Bonding Kinetics of Water in High Concentration Trehalose Solutions at Cryogenic Temperatures" 2009 Journal of Physical Chemistry B 113:6792-6799.
Manning, "Stability of protein pharmaceuticals: an update" 2010 Pharm Res, 27(4):544-75.
Markert, "Lactate dehydrogenase isozymes: dissociation and denaturation by dilution" Jun. 1968 Science, 162(3854):695-7.
McDade, "High-sensitivity enzyme immunoassay for C-reactive protein in dried blood spots" Mar. 2004 Clin Chem, 50(3):652-4.
Mi, "Cryoprotection mechanisms of polyethylene glycols on lactate dehydrogenase during freeze-thawing" Sep. 2004 AAPS J, 6(3):e22.
Mi, "Effects of polyethylene glycol molecular weight and concentration on lactate dehydrogenase activity in solution and after freeze-thawing" May-Jun. 2002 PDA J Pharm Sci Technol, 56(3):115-23.
Mi, "The application and mechanisms of polyethylene glycol 8000 on stabilizing lactate dehydrogenase during lyophilization" 2004 PDA J Pharm Sci Technol, 58(4):192-202.
Miller, "Thermophysical Properties of Trehalose and Its Concentrated Aqueous Solutions" 1997 Pharmaceutical Research, 14(5):578-590.
Nagrath, "Isolation of rare circulating tumour cells in cancer patients by microchip technology" Dec. 2007 Nature, 450(7173):1235-9.
Nema, "Freeze-thaw studies of a model protein, lactate dehydrogenase, in the presence of cryoprotectants" 1993 J Parenter Sci Technol, 47(2):76-83.
Oragene Dx (OGD-500), [online]; 2018 DNA Genotek Inc. [retrieved on Jan. 23, 2018]. Retrieved from the Internet: <URL:http://www.dnagenotek.com/US/products/OGD500.html>; 2 pages.
Panesar, "Stability of serum thyroid hormones following 8-11 years of cold storage" 2010 Clin Chem Lab Med, 48(3):409-12.
Parker, "Mass spectrometry based biomarker discovery, verification, and validation—Quality assurance and control of protein biomarker assays" 2014 Molecular Oncology, 8(4):840-858.
Paul et al., "Synthesis of ultrasmall superparamagnetic iron oxides using reduced polysaccharides," *Bioconjug. Chem.* 2004; 15(2):394-401.
Pikal-Cleland, "Protein denaturation during freezing and thawing in phosphate buffer systems: monomeric and tetrameric beta-galactosidase" 2000 Arch Biochem Biophys, 384(2):398-406.
Poste, "Bring on the biomarkers" Jan. 2011 Nature, 469(7329):156-7.
PrimeStore-MTM, Longhorn Vaccines and Diagnostics, LLC [online]. Retrieved from the Internet: <URL:https://www.lhnvd.com/primestore-mtm>; 1 page.
Privalov, "Cold Denaturation of Proteins" 1990 Critical Reviews in Biochemistry and Molecular Biology, 25(4):281-305.
Qiagen, "Gentra® Puregene® Handbook" Dec. 2014, 72 pages.
Ragoonanan, "Heterogeneity in Desiccated Solutions: Implications for Biostabilization" 2008 Biophysical Journal, 94(6):2212-2227.
Ragoonanan, "Protein stabilization" 2007 Transfusion Medicine and Hemotherapy, 34(4):246-252.
Rawat, "Molecular mechanism of polyethylene glycol mediated stabilization of protein" Feb. 2010 Biochem Biophys Res Commun, 392(4):561-6.
Reinhart, "Influence of polyethylene glycols on the kinetics of rat liver phosphofructokinase" Nov. 1980 J Biol Chem, 255(22):10576-8.
Rhea, "Cancer biomarkers: surviving the journey from bench to bedside" 2011 MLO Med Lab Obs, 43(3):10-2, 16, 18; quiz 20, 22.
Ridker, "C-reactive protein and other markers of inflammation in the prediction of cardiovascular disease in women" Mar. 2000 New England Journal of Medicine, 342(12):836-843.
Rifai, "Protein biomarker discovery and validation: the long and uncertain path to clinical utility" Aug. 2006 Nature Biotechnology, 24(8):971-983.
Ritcharoen et al., "Electrospun dextran fibrous membranes," *Cellulose*, 2008; 15(3):435-444.
Rouy, "Plasma storage at -80 degrees C does not protect matrix metalloproteinase-9 from degradation" Mar. 2005 Anal Biochem, 338(2):294-8.
Roy, "Matrix metalloproteinases as novel biomarkers and potential therapeutic targets in human cancer" 2009 J Clin Oncol, 27(31):5287-97.
SalivaGard™ DNA, [online]; 2018 Biomatrica, Inc. [retrieved on Feb. 1, 2018]. Retrieved from the Internet: <URL:http://biomatrica.com/salivagard-dna.php>; 1 page.
Schrohl, "Banking of biological fluids for studies of disease-associated protein biomarkers" Oct. 2008 Mol Cell Proteomics, 7(10):2061-6.
Schwegman, "Evidence of Partial Unfolding of Proteins at the Ice/Freeze-Concentrate Interface by Infrared Microscopy" 2009 Journal of Pharmaceutical Sciences, 98(9):3239-3246.

(56) References Cited

OTHER PUBLICATIONS

Siegel, "Cancer Statistics, 2015" 2015 Ca-a Cancer Journal for Clinicians, 65(1):5-29.
Soliman, "Factors Affecting Freezing Damage of Lactic Dehydrogenase" Feb. 1971 Cryobiology, 8(1):73-78.
Solivio et al., "Adsorbing/dissolving lyoprotectant matrix technology for non-cryogenic storage of archival human sera," *Scientific Reports*, 2016; 6:24186.
Starnes, "Effect of storage conditions on lactate dehydrogenase released from perfused hearts" 2008 International Journal of Cardiology, 127(1):114-116.
Starnes, "Effects of storage time and freezing on the activity of lactate dehydrogenase released from rat hearts" 2006 Faseb Journal, 20(5):A1153-A1153.
Strambini, "Protein Stability in Ice" Mar. 2007 *Biophysical Journal*, 92:2131-2138.
Sundaramurthi, "Trehalose Crystallization During Freeze-Drying: Implications on Lyoprotection" 2009 *The Journal of Physical Chemistry Letters*, 1(2):510-514.
Tamiya, "Freeze denaturation of enzymes and its prevention with additives" Oct. 1985 Cryobiology, 22(5):446-56.
Timasheff, "Protein Hydration, Thermodynamic Binding, and Preferential Hydration" Nov. 2002 *Biochemistry*, 41(46):13473-13482.
Twomey, "In Situ Spectroscopic Quantification of Protein—Ice Interactions" 2013 *Journal of Physical Chemistry B*, 117:7889-7897.
Vagenende, "Mechanisms of protein stabilization and prevention of protein aggregation by glycerol" Nov. 2009 *Biochemistry*, 48(46):11084-96.
Vaught, "Biobankonomics: developing a sustainable business model approach for the formation of a human tissue biobank" 2011 *Journal of the National Cancer Institute Monographs*, 2011(42):24-31.
Wang, "Lyophilization and development of solid protein pharmaceuticals," *International Journal of Pharmaceutics*, 2000; 203:1-60.
"Whatman® FTA® card technology" datasheet [online]; Sigma Aldrich, [retrieved on Jan. 23, 2018]. Retrieved from the Internet: <URL:https://www.sigmaaldrich.com/catalog/product/sigma/z719730?lang=en&region=US>; 3 pages.
Woodrum, "Stability of free prostate-specific antigen in serum samples under a variety of sample collection and sample storage conditions" 1996 *Urology*, 48(6A Suppl):33-9.
Yamamoto, "Dissociation-association of lactate dehydrogenase isozymes: influences on the formation of tetramers versus dimers of M4-LDH and H4-LDH" 1988 *Int J Biochem*, 20(11):1261-5.
Yang, "Effect of blood sampling, processing, and storage on the measurement of complement activation biomarkers" 2015 *Am J Clin Pathol*, 2015. 143(4):558-65.

\* cited by examiner

COMPOSITIONS AND METHODS FOR STORING LIQUID BIOSPECIMENS

CONTINUING APPLICATION DATA

This application claims the benefit of U.S. Provisional Application Ser. No. 62/840,622 filed Apr. 30, 2019, which is incorporated by reference herein.

GOVERNMENT FUNDING

This invention was made with government support under CA204510 awarded by the National Institutes of Health. The government has certain rights in the invention.

FIELD

The present disclosure relates to compositions and methods for storing liquid biospecimens. The present disclosure further relates to compositions and methods for storing liquid samples that include proteins, enzymes, biological drug molecules, or other biological molecules.

SUMMARY

A lyoprotectant composition includes one or more lyoprotective carbohydrates comprising a non-reducing polysaccharide. The non-reducing polysaccharide may be dextranol. The one or more lyoprotective carbohydrates may include a non-reducing disaccharide, such as trehalose. All of the carbohydrates in the lyoprotectant composition may be non-reducing sugars. The lyoprotectant composition may be free of or substantially free of reducing sugars.

The lyoprotectant composition may further include one or more excipients that may increase lyoprotection of at least one biomarker of interest. The excipient may be an amino acid, an antioxidant, a polymer, a carbohydrate, or a bulking agent.

A lyoprotectant matrix may include a non-woven web of fibers including a non-reducing polysaccharide; and a non-reducing mono- or disaccharide, where the fibers have an average diameter of 0.1 µm to 2.5 µm.

A method of storing a liquid biospecimen includes mixing the liquid biospecimen with a lyoprotectant composition comprising a non-reducing polysaccharide to prepare a specimen-loaded composition; drying the specimen-loaded composition; and storing the dried specimen-loaded composition. The liquid biospecimen may include purified protein, an enzyme, or whole blood, serum, saliva, or urine. The storing may include storing at a temperature of 4° C. or greater, or 22° C. or greater. The storing may include storing for a time period of one week or greater. The method may further include transporting the dried specimen-loaded composition.

DETAILED DESCRIPTION

Figure 1:
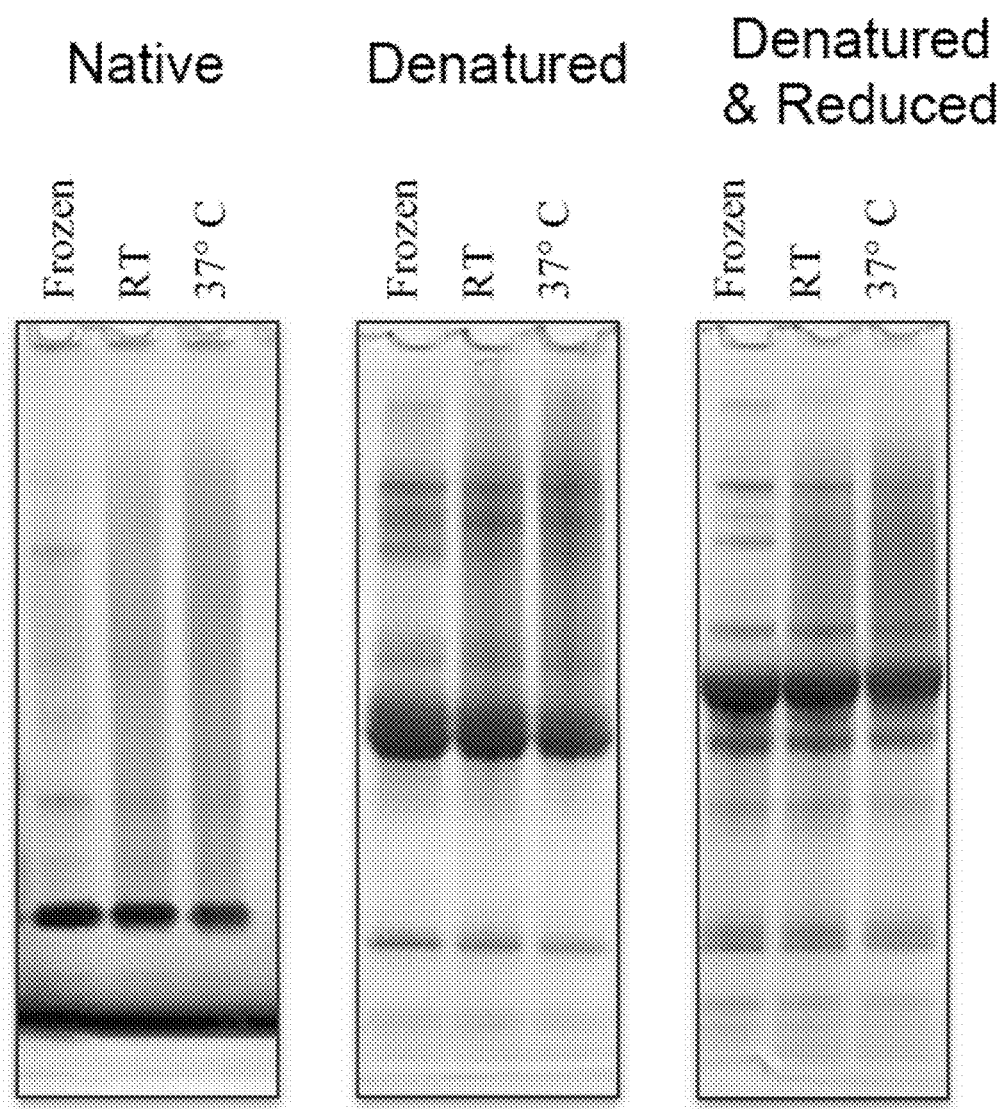
FIG. 1 is an image of gel electrophoresis results from Example 1.

The present disclosure relates to storage compositions for storing biospecimens. Biospecimens may include samples, products, or molecules of biological origin, such as samples prepared from or including tissue samples, bodily fluids, cells, proteins, and the like, or parts thereof. The biospecimens may include purified protein products, such as biologic pharmaceuticals.

The discovery and validation of molecular biomarkers (e.g., disease signatures) can allow early disease detection, the ability to monitor the progression of disease, and/or monitor therapeutic response. Identifying sensitive biomarkers and/or biomarker arrays (correctly identifies patients with disease) and specific biomarkers and/or biomarker arrays (correctly eliminates patients without disease) can, for example, reduce mortality, improve quality of life, and/or reduce healthcare costs. Even with advances in instrumentation and analytical techniques, and with thousands of research articles offering thousands of molecular signatures as potential biomarkers, very few of these biomarkers are approved by FDA. Some reasons for slow progress are the poor stability of many biomarker biomolecules in the collected specimens (e.g., tissue samples, bodily fluids, etc.) and the sub-optimal storage conditions that result in deterioration or other modifications to the samples, which can significantly impede the process of biomarker discovery and clinical implementation.

Molecular biomarkers such as, for example, proteins, enzymes, metabolites, lipids, cell-free RNA, cell-free DNA, RNA within cells, and DNA within cells, can be found in a variety of bodily fluids, tissues, and cells. Blood is an attractive source of molecular information as it circulates and, therefore, samples the whole body. Moreover, blood can be collected in relatively large volumes frequently and easily with minimal risk. For example, blood and serum are easily and relatively painlessly collected compared to body fluids like cerebrospinal fluid and synovial fluid, each of which is collected by methods that are painful and pose risk to the patient. The use of blood and serum for molecular information is also facilitated by the availability of numerous medical laboratory facilities for analysis and the substantial information available on the typical values of many blood and serum components.

While described in detail below in the context of protein biomarkers, the compositions and methods described herein can be used to store a sample and later analyze the sample for any biomarker suitable for the condition under study, analysis, and/or investigation. Thus, the compositions and methods described herein can be used to store a sample so that one or more proteins, enzymes, metabolites, lipids, cell-free RNA, cell-free DNA, RNA within cells, DNA within cells, and/or any combination of biomarkers remains available for later analysis. The use of protein biomarkers as model biomarkers in this disclosure reflects the observation that protein biomarkers are frequently affected by disease, therapeutic response, and/or recovery.

The biomarker pipeline includes a series of phases including discovery, verification, and clinical validation, each of which calls for the availability of high-quality samples. To qualify for clinical approval, a potential biomarker needs to be verified and validated using hundreds of specimens and should exhibit reproducibility, specificity, and sensitivity. Liquid biospecimens are archived in biorepositories, representing a plethora of potential information about initiation and progression of diseases. One challenge for exploring these samples is the availability of advanced and sensitive detection tools to extract information from stored biospecimens. Another challenge is the availability of biospecimens where molecular information content of the samples is conserved. Even when best practices are followed and samples are frozen immediately after being collected and processed, freeze-thaw cycles can compromise sample integrity by introducing stresses that result in modifications to biomarkers including, for example, protein unfolding and/or aggregation, which can irreversibly alter characteristics of the biomarker such as, for example, structure and/or activity.

Much of the damage incurred during cooling, freezing, and cryogenic storage are due to one or more of the following factors. One factor is temperature. The native structure of some proteins can be destabilized at low temperatures, thermodynamically favoring the unfolded state (e.g., cold denaturation). A second factor is osmotic/dehydration stress due to freeze concentration of solutes. Low water chemical activity in the freeze-concentrate decreases the free energy of the denatured state, making it thermodynamically preferred. A third factor is pH shift. Cooling and freezing can induce changes in ionic solubility—as much as a 40-fold concentration increase—and pH, which can destabilize and denature proteins. Slow freezing and thawing can incur more damage due to these factors as proteins are exposed to high solute concentrations and extreme pH for a longer period than fast freezing and thawing. A fourth factor is protein and solute aggregation. Freeze concentration can promote crowding, hydrophobic interactions, and/or changes in free energy, which can result in protein aggregation. A fifth factor is protein-gas interactions. Gas bubbles are generated during cooling due to the diminished gas solubility at low temperatures. Exposure of proteins to the gas-liquid interface can promote denaturation and/or aggregation. A sixth factor is protein-ice interactions. Many proteins are adsorbed onto the ice surface, where they can aggregate and denature. Additionally, ice growth and/or re-crystallization during freezing expose proteins to mechanical compression stresses, which results to unfolding and aggregation. While slow freezing and thawing rates can damage proteins due to prolonged exposure, rapid freezing also can be detrimental as it is associated with a high degree of supercooling, which generates a large number of ice crystals and, consequently, a larger surface area available for interaction with proteins.

Cryogenic storage can impart modifications on proteinaceous biomarkers. The modifications can include, for example, spontaneous unfolding of the protein (e.g., cold denaturation), ice-induced unfolding and/or aggregation, degradation, and/or dissociation, each of which can influence protein recovery and/or biological activity and, consequently, the accuracy of findings on biomarker-related investigations. Many promising protein cancer biomarkers can be susceptible to freeze/thaw and frozen state storage. Lactate dehydrogenase (LDH), for example, is a biomarker currently being evaluated for various types of cancer including renal cancer and melanoma. LDH has been extensively studied and frequently used as a model for protein stabilization research because of its known fragility to storage processes, especially cryogenic storage and freeze-thaw, manifested as change in enzymatic activity often attributable to either association or dissociation of the enzyme's multimer. Other biomarkers susceptible modifications caused by freezing and thawing include the Metalloproteinase (MMP) family (MMP-1, MMP-7, MMP-9, MMP-13) and the related ADAMS family, which are identified as diagnostic and prognostic biomarkers in cancers such as breast, pancreas, lung, bladder, colorectal, ovarian, prostate, and brain cancer.

In addition to the detrimental effects imposed by cryogenic storage on numerous proteinaceous biomarkers, frozen state storage and transport of biospecimens can be costly, requiring large, dedicated, well-controlled, and equipped spaces with a very large carbon footprint. For example, storing only one milliliter of serum can cost $1-1.5 per year. Thus, storing more than 600 million biospecimens can involve at least 30,000 mechanical freezers purchased at a market value of over $600 million, an electricity bill of around $55 million/year, and the added the costs associated with the housing, maintaining, and staffing the biorepositories and the installation of backup generators, safety and security systems, and cataloging/database software. Room temperature storage can provide a less costly alternative for short-term and long-term storing liquid biospecimens in biorepositories.

Dry storage is an attractive alternative to the typical cryogenic storage for stabilization of proteinaceous biomarkers in clinical biofluid samples like blood serum. Commercially available dry state storage technologies are generally used for genetic (e.g., DNA and RNA) biomarker stabilization through the use of a solid insoluble support matrix, chemical stabilizers and air-drying. However, there is a need for improvements in technologies for stabilizing a large spectrum of biomarkers at a dried state.

Polysaccharides may be used to preserve biological samples like proteins, enzymes, therapeutic agents, biofluids such as blood serum or plasma, as well as more complex systems such as cells and tissues, by freezing or drying. Isothermal vitrification is achieved by mixing biological material with a lyoprotectant cocktail that increases the glass transition temperature upon water removal to the point that samples form a glassy amorphous solid at or near room temperature. The glassy amorphous solid entraps macromolecules in place, stabilizing their confirmation and preventing molecular mobility, with the goal of stopping degradation. Dextran has frequently been used as a polysaccharide lyoprotectant in dry protein formulations, mainly due to its high glass transition temperature, which enables room temperature storage. As an inert additive, dextran is particularly suitable to be used as a preservative in pharmaceutical products and numerous drugs on the market contain dextran as a preservative.

Within the glassy amorphic material, the molecules are crowded together reducing physical degradation potential with lowered conformational mobility. On the other hand, the spatial proximity can enhance chemical degradation. For example, most polysaccharides have at least one reducing end containing a reactive aldehyde. In a crowded environment, with heating or prolonged storage at ambient temperatures, the aldehyde can react with amine groups like those found in proteins via a Maillard reaction to produce Amadori products and advanced glycation end-products. This modification to proteins can cause denaturation, aggregation, and reduced immunogenicity if used as a therapeutic agent. In biofluid biospecimens this may lead to decreased detection of clinically or scientifically important biomarkers. Polysaccharides are, therefore, typically not used as a preservative for clinical protein samples, and instead, specimens are frozen for long-term storage. Improved polysaccharide-based lyoprotectant or cryoprotectant compositions are desired.

The present disclosure presents a composition and methodology to enable storing liquid biospecimens (e.g., samples containing or prepared from blood or serum) at room temperature using isothermal vitrification technology. High concentrations of carbohydrate lyoprotectants can stabilize biological specimens by vitrification. The composition may be provided as an electrospun adsorbing/dissolving matrix, which may be made from a lyoprotectant cocktail that includes components that stabilize biomarkers in the liquid biospecimen during isothermal vitrification and room temperature storage. When the liquid biospecimen is applied onto the matrix, the matrix rapidly adsorbs the liquid biospecimen while dissolving in it. The matrix saturated with the liquid biospecimen may then be rapidly desiccated to produce a highly viscous fluid. In the highly viscous, glassy state the biomarkers in the biospecimen are stabilized and can be stored or transported, providing an alternative to frozen state storage and transportation for fluid biospecimens. When rehydrated after storage, the matrix allows for protein recovery and processing (e.g., testing or analysis) of desired biomarkers. Use of the lyoprotectant composition may also increase the solubility of proteins in the sample similar to what is typically observed with PEGylation.

Isothermal vitrification using the adsorbent/dissolving matrix technology is described in detail as follows in the context of an exemplary embodiment in which the liquid biospecimen is serum and the biomarker is a protein. As will be described in greater detail later, this is a model, exemplary embodiment. Variations in the adsorbent/dissolving matrix and variations in the methods of preparing and using the matrix are possible and addressed below.

The term "reducing sugar" is used in this disclosure to describe a sugar (monosaccharide, disaccharide, oligosaccharide, or polysaccharide) that includes a free aldehyde group or free ketone group and is capable of acting as a reducing agent (capable of donating an electron to another chemical species).

The term "non-reducing sugar" is used in this disclosure to describe a sugar (monosaccharide, disaccharide, oligosaccharide, or polysaccharide) that does not include free aldehyde groups or free ketone groups and is not capable of acting as a reducing agent (is not capable of donating an electron to another chemical species).

The term "substantially" as used here has the same meaning as "significantly," and can be understood to modify the term that follows by at least about 75%, at least about 90%, at least about 95%, or at least about 98%. The term "not substantially" as used here has the same meaning as "not significantly," and can be understood to have the inverse meaning of "substantially," i.e., modifying the term that follows by not more than 25%, not more than 10%, not more than 5%, or not more than 2%.

The term "about" is used here in conjunction with numeric values to include normal variations in measurements as expected by persons skilled in the art, and is understood have the same meaning as "approximately" and to cover a typical margin of error, such as ±5% of the stated value.

Terms such as "a," "an," and "the" are not intended to refer to only a singular entity, but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

Any amounts (e.g., concentrations) of components in a composition given as a percentage (%) refer to a percentage by weight per volume unless otherwise indicated.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

The compositions of the present disclosure include one or more lyoprotective carbohydrates. According to some embodiments, the compositions include one or more lyoprotective carbohydrates that are non-reducing sugars. The composition may include a combination of a non-reducing polysaccharide and a non-reducing disaccharide. The composition may be free or substantially free of reducing sugars. In some embodiments the composition includes dextranol or another non-reducing polysaccharide. The composition may be free or substantially free of dextran. The composition may further include, for example, trehalose. The composition may further be free or substantially free of reducing monosaccharides and reducing disaccharides.

The lyoprotective carbohydrate may be prepared by chemically reducing the anomeric carbon of a carbohydrate from an aldehyde group to an alcohol group.

While described herein in the context of a composition prepared from trehalose and dextranol, the composition may be prepared from any suitable lyoprotectant carbohydrate or lyoprotectant combination of carbohydrates. TABLE 1 lists some exemplary alternative lyoprotective carbohydrates.

TABLE 1

Exemplary lyoprotectant carbohydrates

| Sugar | Glass Transition Temperature - Tg (° C.) |
| --- | --- |
| Sorbitol | −3 |
| Mannitol | 13 |
| Sucrose | 67 |
| Myo-Inositol | 221 |
| Raffinose | 112 |
| Trehalose | 115 |
| Dextranol | 220 |

The composition includes a lyoprotective polymer, which may include a non-reducing polysaccharide, another lyoprotective polymer, or a combination thereof. For example, the composition may include polyvinylpyrrolidone (PVP) as a lyoprotective polymer. PVP exhibits a relatively high Tg (approximately 90° C. to 189° C., depending on molecular weight and moisture content) and can be included in the composition.

The lyoprotective polymer component of the lyoprotectant composition may be selected to have a maximum molecular weight of no more than 300 kDa such as, for example, no more than 250 kDa, no more than 200 kDa, no more than 150 kDa, no more than 100 kDa, no more than 90 kDa, no more than 85 kDa, no more than 80 kDa, no more than 75 kDa, no more than 70 kDa, no more than 65 kDa, no more than 60 kDa, no more than 55 kDa, or no more than 40 kDa. The lyoprotective polymer component of the lyoprotectant composition may be selected to have a minimum molecular weight of at least 20 kDa such as, for example, at least 25 kDa, at least 30 kDa, at least 35 kDa, at least 40 kDa, at least 45 kDa, at least 50 kDa, at least 55 kDa, at least 60 kDa, at least 65 kDa, at least 70 kDa, at least 75 kDa, at least 80 kDa, at least 85 kDa, or at least 90 kDa. The lyoprotective polymer component of the lyoprotectant composition may be selected to have a molecular weight that falls within a range having as endpoints any maximum polymer molecular weight set forth above and any minimum polymer molecular weight set forth above that is less than then maximum molecular weight.

The composition may be provided in the form of a matrix that is used by dissolving the matrix into the liquid biospecimen. Regardless of the particular method used to prepare the lyoprotectant matrix, the matrix may be prepared from a matrix "cocktail" that includes the matrix components and any excipients as set forth in detail below. In the description that follows, unless otherwise indicated, concentrations of matrix components and excipients are provided in the context of the matrix cocktail from which the lyoprotectant matrix is prepared.

The cocktail used to produce the lyoprotectant matrix includes a lyoprotective carbohydrate component and a polymer component, where the lyoprotective carbohydrate component includes non-polymeric components. In some embodiments, the lyoprotective carbohydrate component can include a monosaccharide or disaccharide, a combination of monosaccharides, a combination of disaccharides, or a combination of monosaccharides or disaccharides. Exemplary suitable monosaccharides and disaccharides are listed in TABLE 1. The lyoprotective carbohydrate component may be provided at a minimum concentration of at least 0.5 M such as, for example, at least 0.6 M, at least 0.7 M, at least 0.8 M, at least 0.9 M, at least 1 M, at least 1.1 M, or at least 1.2 M. The lyoprotective carbohydrate component may be provided at a maximum concentration of no more than 2 M such as, for example, no more than 1.8 M, no more than 1.7 M, no more than 1.6 M, no more than 1.5 M, no more than 1.4 M, no more than 1.3 M, no more than 1.2 M, no more than 1.1 M, or no more than 1 M. In some embodiments, the concentration of the lyoprotective carbohydrate component may expressed as a range having as endpoints any minimum lyoprotective carbohydrate component concentration set forth above and any maximum lyoprotective carbohydrate component concentration set forth above that is greater than the minimum lyoprotective carbohydrate component concentration. For example, in some embodiments, the lyoprotective carbohydrate component may be provided at a concentration of from 0.8 M to 1.2 M.

The polymer component may include one or more lyoprotective polymers, which may include a non-reducing polysaccharide, another lyoprotective polymer, or a combination thereof. In some embodiments, the polymer component includes at least a non-reducing polysaccharide. In some embodiments, the polymer component includes at least dextranol. The polymer component may be provided in the cocktail used to produce the lyoprotectant matrix at a concentration of from 0.1 g/mL to 5 g/mL. Within this range, the polymer component may have a minimum concentration of at least 0.1 g/mL such as, for example, at least 0.2 g/mL, at least 0.3 g/mL, at least 0.4 g/mL, at least 0.5 g/mL, at least 0.6 g/mL, at least 0.7 g/mL, at least 0.8 g/mL, at least 0.9 g/mL, at least 1 g/mL, at least 1.5 g/mL, at least 2 g/mL, or at least 2.5 g/mL. Also within this range, the polymer component may have a maximum concentration of no more than 5 g/mL such as, for example, no more than 4.5 g/mL, no more than 4 g/mL, no more than 3.5 g/mL, no more than 3 g/mL, no more than 2.5 g/mL, no more than 2 g/mL, no more than 1.5 g/mL, or no more than 1 g/mL. In some embodiments, the polymer component may be present at a concentration within a range having as endpoints any maximum polymer concentration set forth above and any minimum polymer concentration set forth above that is less than the maximum polymer concentration. For example, in some embodiments, the polymer component may be present at a concentration of from 0.3 g/mL to 1 g/mL. In some embodiments, the concentration of the polymer component refers to the concentration of dextranol. In certain embodiments, the polymer component may be present at a concentration of 1 g/mL. In one particular embodiment, the polymer component present at a concentration of 1 g/mL includes or is dextranol.

The matrix—and, therefore, the matrix cocktail from which the matrix is prepared—can optionally include one or more excipients that may be included in the matrix cocktail at a v/v concentration of from 0.05% to 10%. For example, the matrix may include excipients such as glycerol, polyethylene glycol (PEG), polysorbate 20 (e.g., TWEEN® 20), gluconic acid, and/or glucamine. However, the matrix may be prepared to include any suitable excipient and/or combination of excipients. In some cases, an excipient may be selected based on its known ability to limit destabilization and/or damage to a biomarker of interest in a biospecimen. Thus, in some embodiments, a matrix designed for storing a biospecimen that will be analyzed for a particular biomarker can include one or more excipients selected specifically because of the lyoprotective effect of the excipient on the biomarker of interest. In other embodiments, a matrix may be prepared so that it reflects a generic or nearly universal storage matrix that may be used for a significant plurality of biospecimens and is capable of lyoprotecting a plurality of commonly assayed biomarkers.

Thus, a lyoprotectant matrix can include one or more excipients such as, for example, an amino acid (e.g., L-arginine, glycine-betaine, sodium glutamate, methionine, isoleucine, glutamic acid, glycine, histidine, lysine, cysteine, or tryptophan), an antioxidant (e.g., ascorbic acid, methionine, glutathione, propyl gallate, butylated hydroxyl anisole, or butylated hydroxytoluene), a polymer (e.g., oligoarginine or oligolysine attached to PEG, hydroxyethyl starch, heparin, polyacrylic acid, hydroxypropyl-β-cyclodextrin, FICOLL® 70, polyvinylpyrrolidone, polysorbate 20, or polysorbate 80), a carbohydrate (e.g., sucrose), and/or a bulking agent (algin, lactalbumin, peptone, bovine serum albumin, gelatin, skimmed milk, casein, or casitone).

When present, glycerol may be present in the matrix cocktail at a maximum concentration of less than 10% (v/v) such as, for example, no more than 9.5%, no more than 9%, no more than 8.5%, no more than 8%, no more than 7.5%, no more than 7%, no more than 6.5%, no more than 6%, no more than 5.5%, no more than 5%, no more than 3.5%, no more than 3%, no more than 2.5%, no more than 2%, no more than 1.5%, no more than 1%, no more than 0.5%, or no more than 0.25%. In some embodiments, glycerol, when present, may be present at a minimum concentration of at least 0.01% such as, for example, at least 0.1%, at least 0.25%, at least 0.5%, at least 1%, at least 1.5%, at least 2%, at least 2.5%, at least 3%, at least 3.5%, at least 4%, at least 4.5%, at least 5%, at least 5.5%, at least 6%, or at least 7%. In some embodiments, glycerol may be present in an amount within a range having endpoints defined by any maximum amount set forth above and any minimum amount set forth above that is less than the maximum amount. For example, glycerol may be provided at a concentration of from 0.1% to 1.5%. In another example, glycerol may be provided in a concentration of from 0.1% to 3%. In one particular embodiment, glycerol may be provided at a concentration of 3%.

When present, PEG may be present in the matrix cocktail at a maximum concentration of less than 10% (v/v) such as, for example, no more than 9.5%, no more than 9%, no more than 8.5%, no more than 8%, no more than 7.5%, no more than 7%, no more than 6.5%, no more than 6%, no more than 5.5%, no more than 5%, no more than 3.5%, no more than 3%, no more than 2.5%, no more than 2%, no more than 1.5%, no more than 1%, no more than 0.5%, or no more than 0.25%. In some embodiments, PEG, when present, may be present at a minimum concentration of at least 0.01% such as, for example, at least 0.1%, at least 0.25%, at least 0.5%, at least 1%, at least 1.5%, at least 2%, at least 2.5%, at least 3%, at least 3.5%, at least 4%, at least 4.5%, at least 5%, at least 5.5%, at least 6%, or at least 7%. In some embodiments, PEG may be present in an amount within a range having endpoints defined by any maximum amount set forth above and any minimum amount set forth above that is less than the maximum amount. For example, PEG may be provided at a concentration of from 0.1% to 10%. In another example, PEG may be provided at a concentration of 0.1% to 1.5%. In another example, PEG may be provided in a concentration of from 0.3% to 1%. In one particular embodiment, PEG may be provided at a concentration of 1%.

When present, polysorbate 20 may be present at a maximum concentration of less than 10% (v/v) such as, for example, no more than 9.5%, no more than 9%, no more than 8.5%, no more than 8%, no more than 7.5%, no more than 7%, no more than 6.5%, no more than 6%, no more than 5.5%, no more than 5%, no more than 3.5%, no more than 3%, no more than 2.5%, no more than 2%, no more than 1.5%, no more than 1%, no more than 0.5%, or no more than 0.25%. In some embodiments, polysorbate 20, when present, may be present at a minimum concentration of at least 0.01% such as, for example, at least 0.1%, at least 0.2%, at least 0.3%, at least 0.4%, at least 0.5%, at least 0.6%, at least 0.7%, at least 0.8%, at least 0.9%, at least 1%, at least 1.5%, at least 2%, at least 2.5%, at least 3%, at least 3.5%, at least 4%, at least 4.5%, at least 5%, at least 5.5%, at least 6%, or at least 7%. In some embodiments, polysorbate 20 may be present in an amount within a range having endpoints defined by any maximum amount set forth above and any minimum amount set forth above that is less than the maximum amount. For example, polysorbate 20 may be provided at a concentration of from 0.1% to 10%. In another example, polysorbate 20 may be provided at a concentration of 0.1% to 1.5%. In another example, polysorbate 20 may be provided in a concentration of from 0.1% to 3%. In one particular embodiment, polysorbate 20 may be provided at a concentration of 0.3%.

When present, gluconic acid may be present in the matrix cocktail at a maximum concentration of less than 10% (v/v) such as, for example, no more than 9.5%, no more than 9%, no more than 8.5%, no more than 8%, no more than 7.5%, no more than 7%, no more than 6.5%, no more than 6%, no more than 5.5%, no more than 5%, no more than 3.5%, no more than 3%, no more than 2.5%, no more than 2%, no more than 1.5%, no more than 1%, no more than 0.5%, or no more than 0.25%. In some embodiments, gluconic acid, when present, may be present at a minimum concentration of at least 0.01% such as, for example, at least 0.1%, at least 0.2%, at least 0.3%, at least 0.4%, at least 0.5%, at least 0.6%, at least 0.7%, at least 0.8%, at least 0.9%, at least 1%, at least 1.5%, at least 2%, at least 2.5%, at least 3%, at least 3.5%, at least 4%, at least 4.5%, at least 5%, at least 5.5%, at least 6%, or at least 7%. In some embodiments, gluconic acid may be present in an amount within a range having endpoints defined by any maximum amount set forth above and any minimum amount set forth above that is less than the maximum amount. For example, gluconic acid may be provided at a concentration of from 0.1% to 10%. In another example, gluconic acid may be provided at a concentration of 0.1% to 3%. In another example, gluconic acid may be provided in a concentration of from 0.3% to 1%. In one particular embodiment, gluconic acid may be provided at a concentration of 0.3%.

When present, glucamine may be present in the matrix cocktail at a maximum concentration of less than 10% (v/v) such as, for example, no more than 9.5%, no more than 9%, no more than 8.5%, no more than 8%, no more than 7.5%, no more than 7%, no more than 6.5%, no more than 6%, no more than 5.5%, no more than 5%, no more than 3.5%, no more than 3%, no more than 2.5%, no more than 2%, no more than 1.5%, no more than 1%, no more than 0.5%, or no more than 0.25%. In some embodiments, glucamine, when present, may be present at a minimum concentration of at least 0.01% such as, for example, at least 0.1%, at least 0.2%, at least 0.3%, at least 0.4%, at least 0.5%, at least 0.6%, at least 0.7%, at least 0.8%, at least 0.9%, at least 1%, at least 1.5%, at least 2%, at least 2.5%, at least 3%, at least 3.5%, at least 4%, at least 4.5%, at least 5%, at least 5.5%, at least 6%, or at least 7%. In some embodiments, glucamine may be present in an amount within a range having endpoints defined by any maximum amount set forth above and any minimum amount set forth above that is less than the maximum amount. For example, glucamine may be provided at a concentration of from 0.1% to 10%. In another example, glucamine may be provided at a concentration of 0.1% to 3%. In another example, glucamine may be provided in a concentration of from 0.3% to 1%. In one particular embodiment, glucamine may be provided at a concentration of 0.2%.

The liquid biospecimen preserved using the lyoprotectant composition or matrix can be any suitable liquid biospecimen. The liquid biospecimen may be a sample, product, or molecule of biological origin, such as samples prepared from or including tissue samples, bodily fluids, cells, tissues, organs, proteins, and the like, or parts thereof. Exemplary liquid biospecimens include whole blood, serum, plasma, saliva, tears, sputum, bronchial lavage fluid, cerebrospinal fluid, ascites, synovial fluid, urine, and products, parts, and liquid samples prepared therefrom. The lyoprotectant compositions of the present disclosure may be particularly suitable for storage of purified protein products, such as biologic pharmaceuticals.

One feature of the lyoprotectant matrix is that the matrix adsorbs and dissolves so that the lyoprotective materials in the matrix are uniformly distributed in the liquid biospecimen. As used herein, the term "uniformly distributed" refers to the character of a mixture of at least a portion of a liquid biospecimen and at least a portion of the lyoprotectant matrix in which the mixture exhibits no clumping of the lyoprotective carbohydrate and/or no skin formation visible to the unaided naked eye.

In another aspect, this disclosure describes the desiccated storage and reconstitution of a liquid biospecimen that includes at least one biomarker of interest in the lyoprotectant composition. Generally, the method includes providing any embodiment of the lyoprotectant composition described herein, introducing at least a portion of a liquid biospecimen to the lyoprotectant composition, drying the specimen-loaded composition, and storing and/or transporting the dried specimen-loaded composition. Transporting the dried specimen-loaded composition may include transporting within a facility or to another facility (e.g., building), another town, state, or country.

Exemplary biomarkers that may be mixed with or stored in the lyoprotectant composition (e.g., matrix) of the present disclosure include anaplastic lymphoma kinase (ALK), carbohydrate antigen 125 (CA-125), human chorionic gonadotropin-β (HCG-β), alpha-fetoprotein (AFP), calcitonin, nuclear matrix protein-22 (NMP-22), prostate cancer antigen-3 (PCA-3), estrogen receptor (ER), MMP-2, MMP-9, echinoderm microtubule-associated protein-like 4 (EML4), prostate specific-antigen, C-reactive protein, neuropilin-1, matrix metalloproteinase-7 (MMPI), lactate dehydrogenase (LDH), epidermal growth factor receptor (EGFR), vascular endothelial growth factor (VEGF), and combinations thereof.

In one aspect, the method includes providing any embodiment of the lyoprotectant composition as a matrix, introducing at least a portion of a liquid biospecimen to the lyoprotectant matrix, drying the specimen-loaded matrix, and storing and/or transporting the dried specimen-loaded matrix.

The liquid biospecimen may be obtained by any conventional method for obtaining a liquid biospecimen from a subject.

The specimen-loaded composition or matrix may be dried by any suitable method. In some embodiments, the specimen-loaded composition or matrix may be air dried. In other embodiments, the specimen-loaded composition or matrix may be vacuum dried. The specimen-loaded composition or matrix may be dried for any suitable length of time to reduce the water content of the mixture to no more than 10% such as, for example, no more than 7%, no more than 6.8%, no more than 6.6%, no more than 6.4%, no more than 6.2%, no more than 6%, no more than 5.8%, no more than 5.6%, no more than 5.4%, no more than 5.2%, no more than 5%, no more than 4.8%, no more than 4.6%, no more than 4.4%, no more than 4.2%, no more than 4%, no more than 3.8%, no more than 3.6%, no more than 3.4%, no more than 3.2%, no more than 3%, no more than 2.8%, no more than 2.6%, no more than 2.4%, no more than 2.2%, or no more than 2%. In some embodiments, drying the specimen-loaded composition or matrix for 24 hours results in a water content of 7%.

The dried specimen-loaded composition or matrix may be stored at any suitable temperature such as, for example, a temperature below the glass transition temperature of the lyoprotectant matrix. For example, a specimen loaded onto a lyoprotective composition or matrix prepared from trehalose and dextranol can be readily stored at room temperature. Alternative lyoprotective compositions or matrices prepared from alternative materials—such as those listed in TABLE 1—may dictate a storage temperature at which the dried mixture that is appropriate when the specified lyoprotectant composition or matrix is used.

The dried specimen-loaded composition or matrix may be stored in this manner for a period of at least two years. Long-term stability of a desiccated biospecimen can be evaluated using accelerated aging techniques that are conventional and well-known to those of ordinary skill in the art. Using such techniques, one can assess the stability of samples that have been aged to correspond to, for example, up to 12 years of storage. Samples that demonstrate stability after being subjected to accelerated aging that corresponds to 12 years of storage can be concluded to remain stable for even longer periods of time.

The lyoprotectant compositions of the present disclosure may be particularly suitable for short or medium-term storage, such as may be useful for transporting biospecimens. In some embodiments, the dried specimen-loaded composition or matrix is stable for up to 3 months, up to 6 months, up to 12 months, up to 18 months, up to 2 years, or up to 3 years. The stability of the dried specimen-loaded composition or matrix refers to the availability of any desired biomarkers in the specimen for further processing (e.g., testing or analysis) after rehydration and reconstitution of the specimen. In some embodiments, at least 50%, at least 60%, at least 75%, at least 80%, at least 85%, at least 90%, or at least 95% of the biomarkers of interest can be recovered from a rehydrated and reconstituted specimen after storage and/or transport.

After storage, the dried specimen-loaded composition or matrix may be rehydrated to reconstitute the liquid biospecimen so that the contents of the sample, including at least one biomarker of interest, can be analyzed. The liquid biospecimen may be reconstituted by simply adding purified water to the dried specimen-loaded composition or matrix. Additional samples preparation steps may be performed to prepare the sample for analysis, such as mixing the sample with a buffer. According to an embodiment, the sample may be analyzed without removing one or more (or any) of the constituents of the lyoprotectant composition. If only a portion of the dried specimen is needed for analysis, a piece of the dried specimen-loaded composition or matrix may be broken off and used while the remainder of the dried specimen-loaded composition or matrix is left intact. No further manipulation of the dried specimen-loaded composition or matrix is necessary. In contrast, if only a portion of a frozen liquid specimen is needed for analysis, the entire frozen liquid specimen must be thawed, an aliquot of the liquid specimen removed, and the unused portion of the liquid specimen re-frozen. Thawing and re-freezing can influence the stability and/or activity of biomarkers remaining in the unused portion of the liquid specimen as a result of undergoing the freeze-thaw cycle and, in some cases, many freeze-thaw cycles as a result of repeated aliquoting of the specimen.

This disclosure describes an exemplary lyoprotectant composition of trehalose and dextranol. This disclosure further describes a more complex exemplary composition that includes one or more additional excipients. The exemplary composition containing the excipients illustrates that the basic composition can be tailored to meet the storage requirements of a broad spectrum of biomarkers that may be present in a given biospecimen. The exemplary composition with excipients further illustrates that the basic matrix can be designed to meet the storage requirements of a plurality of biomarkers so that a general composition can be designed to accommodate storage of many different biomarkers. The compositions of the present disclosure may be provided as an electrospun matrix.

EXAMPLES

Chemicals

Experiments were performed using trehalose dihydrate (≥99% purity, Ferro-Pfanstiehl Laboratories in Waukegan, IL), dextran (35-45 kDa, Sigma-Aldrich in St. Louis, MO), and sodium borohydride (from Alfa Aesar in Haverhill, MA). Other chemicals were sourced from Sigma Aldrich. Anonymized human blood samples were collected from volunteers through the University of Minnesota's (UMN) Tissue Procurement Facility (TPF) following a UMN Institutional Review Board (IRB) approved protocol. To separate serum, whole blood was allowed to clot for at least 30 minutes and then centrifuged it for 10 min at 2000 RCF. The serum (the supernatant) was aspirated at room temperature and placed into a new centrifuge tube, taking care not to disturb the cell layer or transfer any cells. The serum was aliquoted into microcentrifuge tubes for use in experiments.

Dextranol (reduced dextran) was synthesized from dextran (from Leuconostoc mesenteroides 35-45 kDa, Sigma Aldrich) using a protocol adapted from Paul et al., *Synthesis of ultrasmall superparamagnetic iron oxides using reduced polysaccharides*, Bioconjug. Chem. 2004; 15(2):394-401. First, a solution of 10% w/v dextran in purified water was prepared. To this, 10 times molar excess of sodium borohydride was added. Mild bubbling was observed as the solution was stirred for 20 hours, after which the pH was adjusted down to about 5 using concentrated HCl.

To remove unreacted sodium borohydride and the byproducts, borane and NaCl, the solution was buffer exchanged into water using either dialysis (Fisherbrand 12,000-14,000 MWCO) or spin concentration tubes (Amicon concentrations 3,000 MWCO). Filtration in spin concentrators had a flow rate of approximately 5-8 mL/hour at 4000 RCF. The process was repeated until small molecule contaminants were diluted to less than 1%. The water was removed by lyophilization.

H1-NMR

Dextran and dextranol products were each dissolved in DMSO-$d_6$ to approximate saturation. NMR tubes were spun to remove insoluble aggregates and the supernatant (0.75 mL) was added to the tubes. NMR spectra was collected on Bruker 600 MHz NMR. Disappearance of anomeric proton peaks at 6.7 ppm, and 6.3 ppm, corresponding to the alpha, and beta stereoisomers of the anomeric center, demonstrated the complete reduction to the alcohol.

Production of the Nonwoven Lyoprotectant Matrix by Electrospinning

Fibers were electrospun to form a dry porous matrix from a lyoprotectant cocktail. The primary components of the cocktail were dextran or dextranol, and trehalose. The dextran-based matrix was prepared with 1.5% glycerol (v/v), 1% polyethylene glycol (w/v), 0.1% Tween® 20 (v/v), 0.3% gluconic acid (w/v), and 0.2% glucamine (w/v). The dextranol-based matrix was similar except that dextran was replaced with dextranol.

To prepare the lyoprotectant cocktail, trehalose (0.4 g/mL) and either dextran or dextranol (1 g/mL) were dissolved in a solution of excipients (at concentrations mentioned above). First, trehalose was added and stirred to dissolve it completely. Then, dextran or dextranol were added in three stages, following each stage with stirring to facilitate dissolution of the solids. The mixture was stirred overnight (16 hours) at 200 RPM, and at 150 RPM the following day for three hours to eliminate most of the bubbles that formed during mixing. The solution was allowed to rest for an additional 12 hours at room temperature to ensure total dissolution.

The solution was electrospun into microfibers across a voltage differential in a controlled environment. One mL syringes were filled with the lyoprotectant cocktail and affixed to a stainless steel 18-gauge, 0.5 inch long, blunt-end needle. A multi-channel syringe-pump (NE-1600 multi-syringe pump; New Era Pump Systems, Farmingdale, NY) extruded the solution at a flowrate of 0.03 mL/min.

Humidity was maintained at 50% relative humidity at room temperature in an environment chamber (Electro-tech Systems, Inc., Glenside, PA). The tip of the needle was placed 15 cm away from an aluminum target between which a voltage differential of 15 kV was applied. After spinning, the matrix was dried in a vacuum chamber overnight to reduce the residual moisture content. The electrospun matrix was stored in a refrigerator (4° C.) until used.

Isothermal Vitrification and Storage

To vitrify serum samples, 50 mg of electrospun fibers were applied into round-bottom screw-top cryogenic vials. To this 150 μL of serum was added. Uncapped tubes were dried in a vacuum chamber (at ≤−85 kPa pressure) containing Drierite® for 24 hours. After this period, the tubes were capped and stored either at room temperature or in an incubator set to either 37° C. or 45° C. for accelerated aging/high-temperature storage experiments. Biologically matched control samples of serum were prepared by freezing and storing the aliquots (without using the lyoprotectant matrix) at −20° C.

To reconstitute vitrified samples, 1.5 mL PBS (Phosphate Buffered Saline) was added to the dried samples and the tubes were incubated for 1 hour with gentle shaking, followed by gentle mixing by pipetting. This resulted in a sample that was 10-fold diluted relative to the original serum.

Gel Electrophoresis and Staining

Gel electrophoresis was carried out using Invitrogen NuPAGE™ and NativePAGE™ system (ThermoFisher Scientific in Waltham, MA). For serum analysis, the equivalent of 0.4 μL of serum (i.e., 4 μL of diluted serum) per well was loaded in a 10 well gel. Samples were prepared either with NativePAGE buffer for native gel electrophoresis, or with LDS sample buffer for denatured samples, and with LDS sample buffer and the reducing agent for denatured and reduced samples. Both the denatured as well as the denatured and reduced samples were boiled for 10 minutes prior to loading on the gel. The gels were run for 75 minutes at a potential of 150 V. For general protein stain, native gels were stained using the NativePAGE cathode buffer per manufacturer's instructions. The denaturing gels were stained for total protein using Imperial™ protein stain (ThermoFisher Scientific). Glycoproteins were detected in gels using Pierce™ Glycoprotein Staining kit (Pierce #24562) per manufacturer's instructions.

ELISAs

Enzyme linked immunoassays (ELISAs) were performed for osteopontin, MMP-7, neuropilin-1, and prostate specific antigen (PSA), following manufacturer's instructions. The following kits were used: Human Osteopontin ELISA Kit (Abcam, Cambridge, UK, #ab192143), Human Neuropilin-1 ELISA Kit (Abcam #ab227901), Human Total Prostate Specific Antigen ELISA Kit (Abcam #ab188388), and Quantikine ELISA Human Total MMP-7 (R&D Systems Minneapolis, MN, #DMP700). Plates were read in a Tecan Infinite 200 Pro M Nano plate reader at 450 nm.

TCA Precipitation

TCA precipitation was carried out by mixing equal parts of resuspended vitrified serum (or the frozen serum control, equivalently diluted after thawing) and 20% TCA (trichloroethanoic acid). After mixing 100 μL of each part, the samples were incubated on ice for 15 minutes. Subsequently, samples were centrifuged for 10 minutes at 10,000 RCF, the tubes were photographed, and the supernatant was decanted. The pellets were suspended in 400 μL saturated guanidine hydrochloride for protein quantification.

Protein Quantification

Protein was quantified using BCA Protein assay (ThermoFisher Scientific). Standard curve was constructed using bovine serum albumin (BSA) standard. Samples from TCA precipitation were analyzed; both the "soluble" fraction and "precipitate." Assay was quantified using a Tecan Infinite® 200 Pro M Nano plate reader at 562 nm.

Example 1

Serum samples were stored in a dextran-based matrix and tested at different conditions using gel electrophoresis to evaluate damage to proteins in the samples.

Serum samples were stored for 16 weeks frozen or vitrified in a dextran-based lyoprotective composition. The vitrified samples were stored at room temperature ("RT") and at 37° C. After 16 weeks of storage, the samples were analyzed to study the effects of storage conditions.

The frozen samples were thawed, and the vitrified samples were reconstituted in PBS. Gel electrophoresis was carried out using native conditions, denaturing conditions, or denaturing and reducing conditions. The results are shown in FIG. 1.

It was observed that while freshly vitrified (and immediately reconstituted) serum appears identical to fresh or frozen serum on gel electrophoresis, after sixteen weeks high molecular weight smears were present in the vitrified samples and were more pronounced in samples stored at the higher temperature. Individual protein bands are less detectable due to decreased intensity and smearing. It was further observed that the smearing did not disappear upon denaturation or reduction, suggesting that the smearing is not due only to denaturation, aggregation, or intramolecular disulfide bond formation, but is due to other covalent modification. Even if aggregates had disulfide cross-linking, these bonds would be broken by the reducing agent DTT (dithiothreitol) present in the denatured and reduced gel; yet the smearing remains. This indicates that the smearing is due to a large, non-disulfide, covalent modification of proteins with dextran.

Example 2

The effect of glycosylation on stored serum samples was tested at different conditions using dextran-based matrix.

Figure 2:
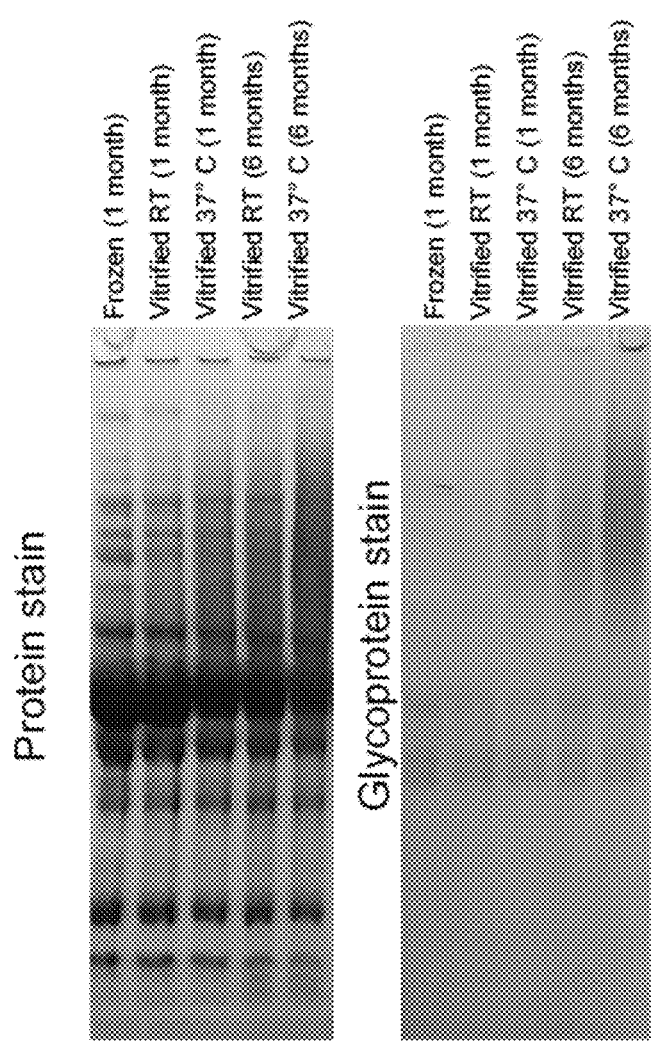
FIG. 2 is an image of SDS-PAGE results from Example 2.

Serum samples were vitrified in a dextran-based matrix and aged 1 or 6 months at either room temperature ("RT") or 37° C. After storage, the samples were run on SDS-PAGE under denaturing/reducing conditions and stained for total protein or for glycoprotein. The results are shown in FIG. 2.

It was observed that smearing was faint after only 1 month of storage at room temperature, but increased with higher temperature storage and with increased storage time. Glycoprotein stain indicated that the high-molecular weight bodies in the smear are becoming significantly glycosylated, suggesting covalent attachment of dextran to proteins. It was also observed that samples that had become more soluble and would not precipitate efficiently using a standard TCA precipitation protocol.

Example 3

Serum samples were stored in a dextran-based matrix and a dextranol-based matrix to compare effects of the storage matrix on the samples.

Figure 3:
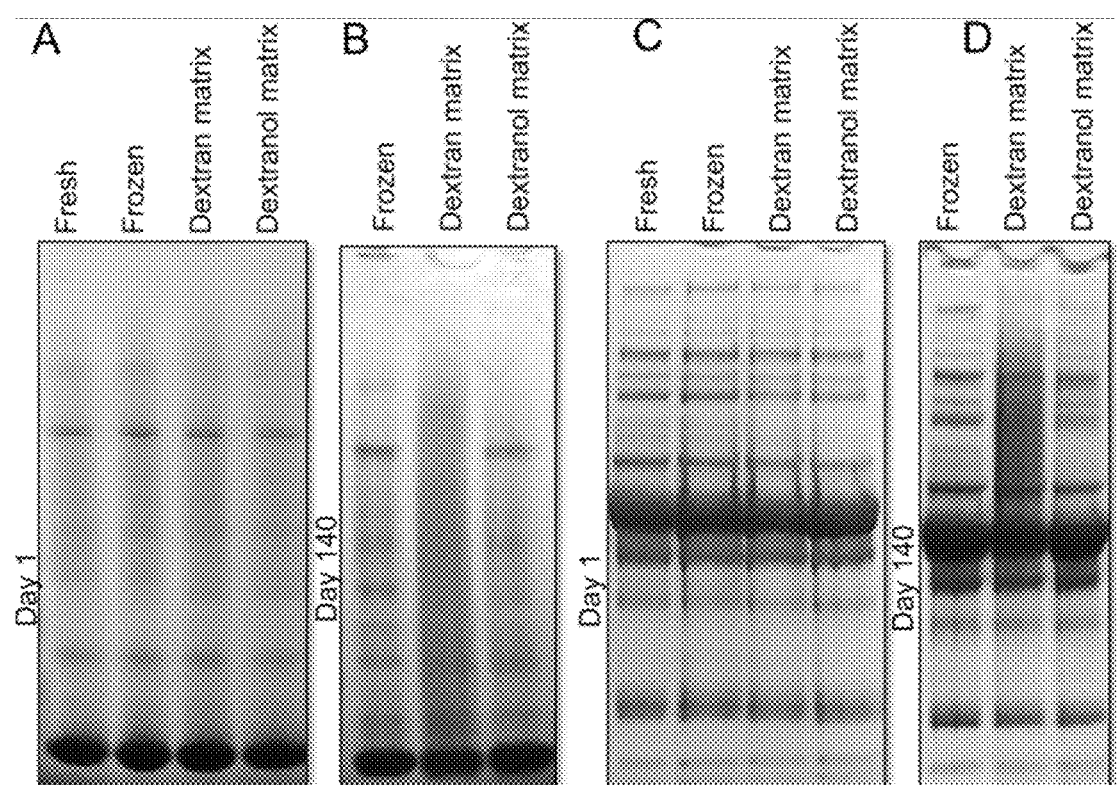
FIG. 3 is an image of gel electrophoresis results from Example 3.

Serum samples in either a dextran-based matrix or a dextranol-based matrix were tested fresh and after frozen and vitrified storage. The samples were analyzed immediately after verification (Day 1) or after aging for 140 days at 37° C. Vitrified samples were reconstituted in PBS. Gel electrophoresis was carried out under both native conditions (gels A and B in FIG. 3) or denaturing/reducing (gels C and D in FIG. 3) conditions. Results are shown in FIG. 3.

It was observed that samples that were frozen, freshly vitrified in dextran-based matrix or dextranol-based matrix were all virtually indistinguishable from fresh, never frozen serum when analyzed by gel electrophoresis under either native or denaturing conditions. However, after 140 days of storage at 37° C., vitrified samples in dextran-based matrix showed significant smearing, while dextranol-based matrix samples were almost indistinguishable from frozen or fresh serum.

Example 4

The ability of dextranol to protect isothermally vitrified serum and BSA in storage at 45° C. was tested.

Figure 4:
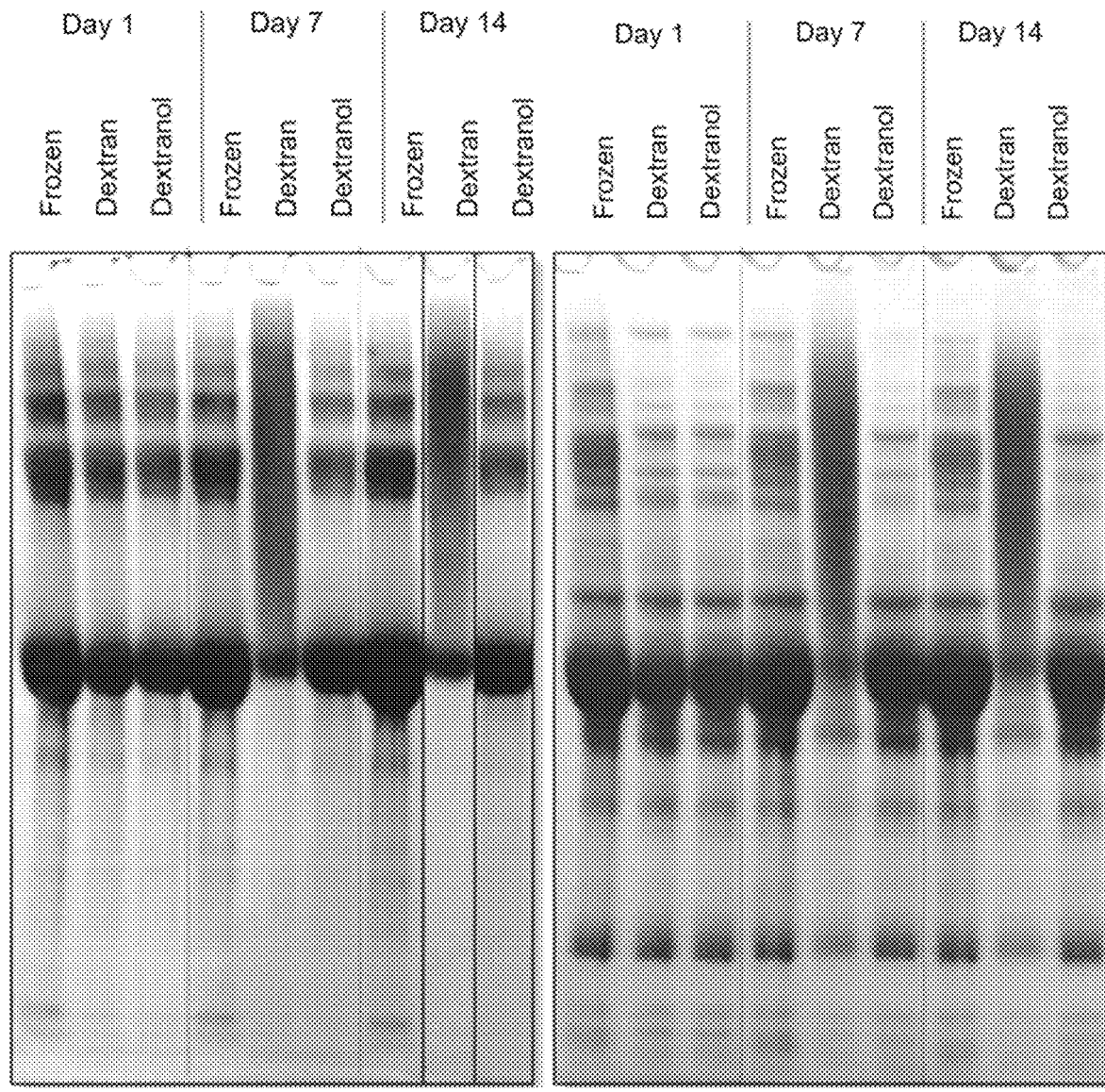
FIG. 4 is an image of Coomassie stained gel results from Example 4.

Samples of BSA (Bovine serum albumin) and human serum were frozen or vitrified in dextran-based and dextranol-based lyoprotectant matrices. Samples were analyzed immediately after vitrification and after storage at 45° C. using Coomassie stained gel. Results are shown in FIG. 4.

It was observed that immediately after vitrification, samples preserved in dextran and dextranol-based lyoprotectant matrices look similar to the frozen sample. After 7 days and 14 days, BSA stored in dextran-based matrix is not in in the major monomer band but is instead mostly in a high-molecular weight smear. BSA stored in dextranol-based matrix still resembled frozen. It should be noted that it is common to see higher molecular bands in SDS-PAGE of BSA due to irreversible multimer formation.

Example 5

The preservation of serum biomarker levels in a dextran-based matrix and a dextranol-based matrix was evaluated.

Figure 5:
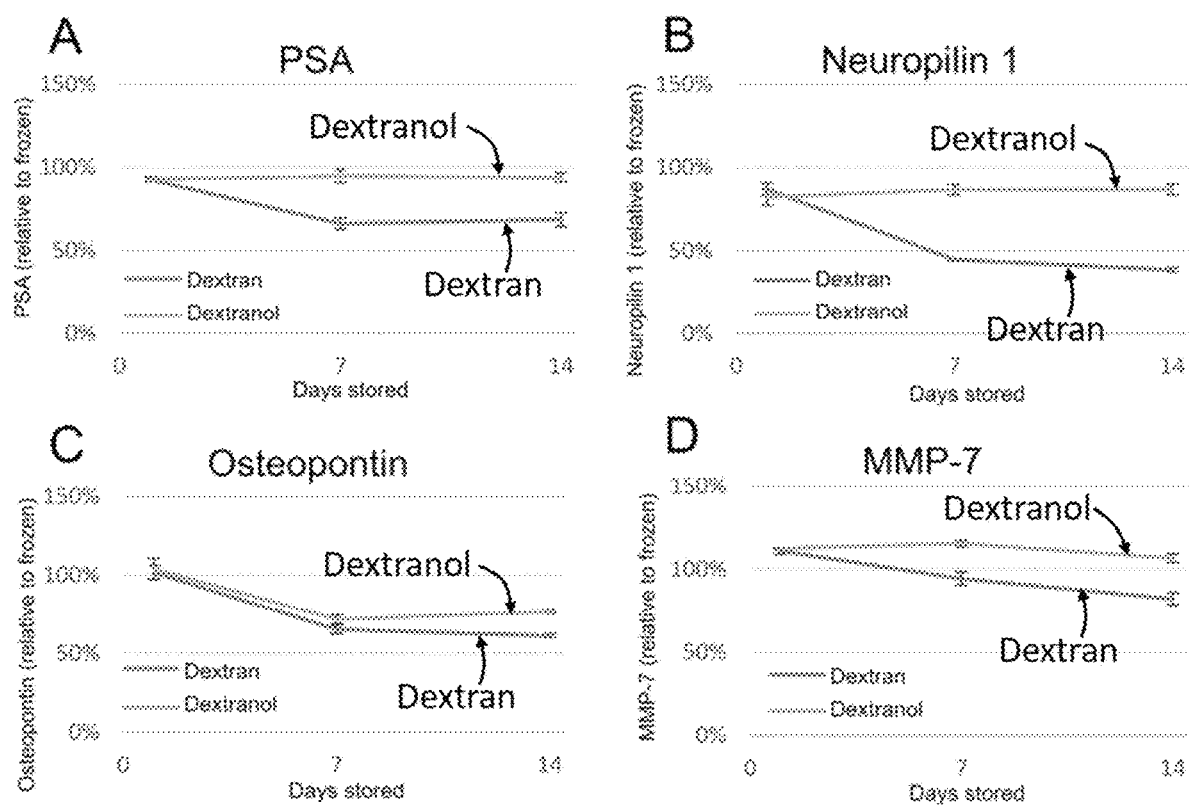
FIG. 5 is an image of biomarker stability results from Example 5.

Four individual proteinaceous biomarkers, (A) PSA (prostate specific antigen), (B) neuropilin 1, (C) osteopontin, and (D) MMP-7 (matrix metalloproteinase 7) in serum samples were stored at high temperature (45° C.) for one or two weeks. The samples were analyzed for biomarker stability using ELISA immediately after drying (day 1), and after one and two weeks after drying and storage. Results are shown in FIG. 5.

It was observed that all four biomarkers (prostate specific antigen, neuropilin-1, osteopontin, and metalloproteinase 7) showed losses (as measured by ELISA) after one or two weeks of storage at 45° C. In dextranol-based matrix, PSA and neuropilin levels were slightly reduced (by 7 and 8%, respectively) on day 1, potentially due to the drying process, but were stable during seven or fourteen days of storage. MMP-7 levels in dextranol-based matrices remained slightly above the frozen control throughout the experiment. However, osteopontin levels in the dextranol-based matrices fell in a similar pattern to that seen in dextran-based matrices, although not quite to the same extent.

Example 6

The effect of dextran-based and dextranol-based lyoprotective compositions on the formation of high-molecular weight species was compared to frozen storage without lyoprotective agents. It should be noted that this experiment was performed without using electrospun fibers and isothermal vitrification, and instead, was performed using dextranol in a standard lyophilization procedure as a replacement for the commonly used dextran.

Figure 6:
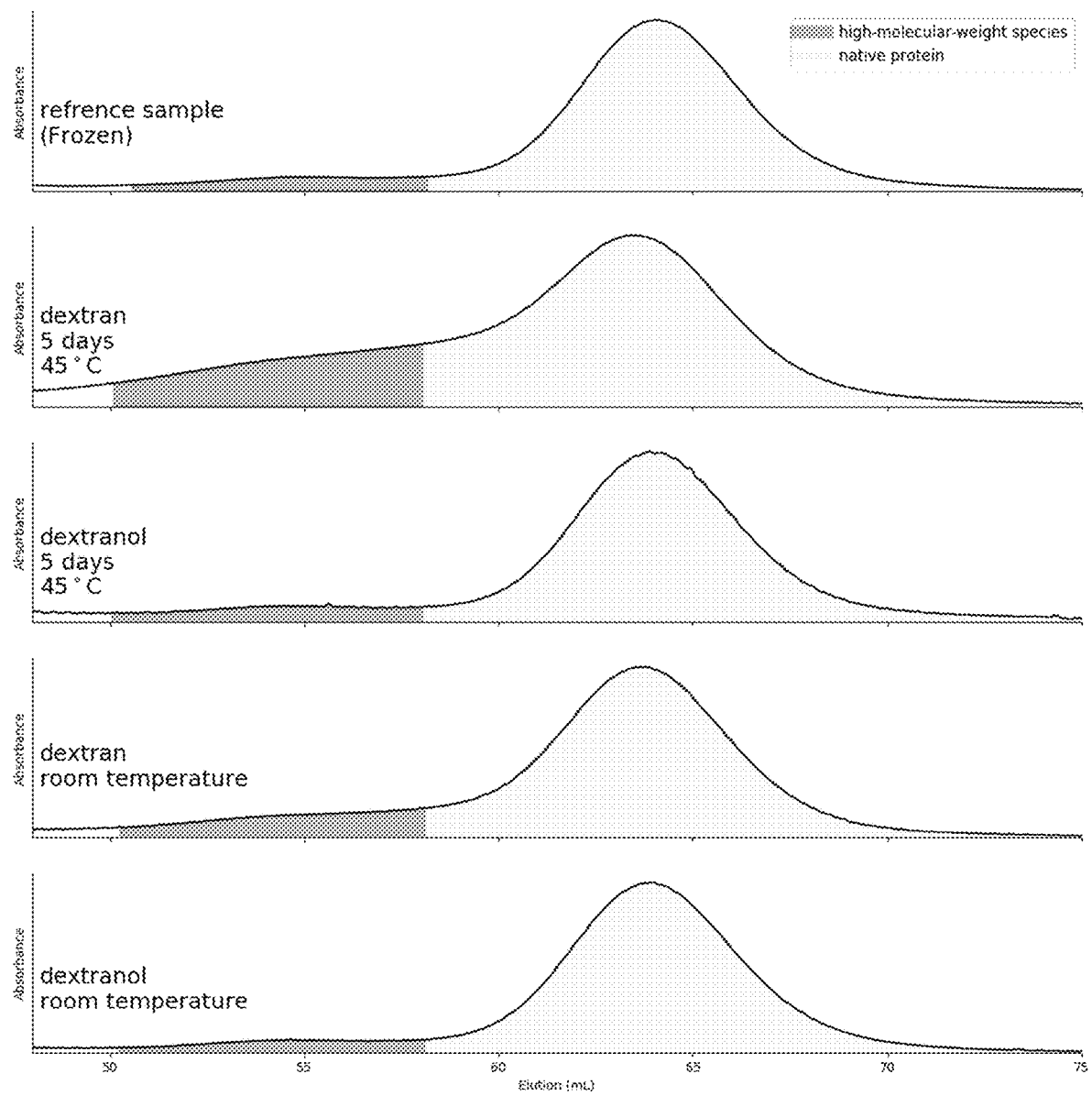
FIG. 6 is an image of size exclusion chromatography results from Example 6.

IgG samples were lyophilized with dextranol or, as a comparison, with dextran, and the formation of high-molecular-weight species after storage was examined. The lyophilized samples were prepared by mixing 2 mg/mL IgG with 20 mg/mL lyoprotectant. Samples were stored at 45° C. for 30 days and at room temperature and −20° C. for 33 days. After storage, high-molecular-weight adducts in the samples were quantified using size exclusion chromatography by comparing the area of the high-molecular-weight species to the total area of both high-molecular-weight and native IgG peaks. The results are shown in TABLE 2 below and in FIG. 6.

TABLE 2

High-molecular-weight adduct formation in lyophilized IgG

| Storage Condition | | Amount of High-molecular-weight species |
|---|---|---|
| Temperature | Lyoprotectant | |
| −20° C. | None | 9% |
| 45° C. | Dextran | 39% |
| | Dextranol | 9% |
| Room Temperature | Dextran | 14% |
| | Dextranol | 8% |

It was observed that after approximately one month of storage, IgG remains almost exclusively in its native form (FIG. 6, lighter shaded area) when frozen without the presence of a lyoprotectant, but high-molecular-weight species (FIG. 6, darker shaded area) increase when stored lyophilized with dextran, especially at high temperature. IgG has less than 10% high-molecular-weight species when stored frozen without the presence of a lyoprotectant (TABLE 2), but when stored in dextran, the fraction of high-molecular-weight species increased to 14% after one month at room temperature. When stored at an elevated temperature (45° C.), the fraction of high-molecular-weight species in the dextran-stored sample increases to 39%. On the other hand, fraction of high-molecular-weight species in the IgG sample stored with dextranol lyoprotectant remained virtually the same at both room temperature and at 45° C.

It was concluded that dextranol is a superior lyoprotectant to dextran and may be able to help extend the shelf-lives of purified protein products like biologic drugs, clinical samples, or research, cleaning, and industrial enzymes.

Example 7

The ability of the matrix to preserve whole cells and RNA isolated from the whole cells was tested. The cells were from a breast cancer cell line MDA-MB-231. The cells were grown using high glucose media with 10% Fetal Bovine Serum (FBS) and 1% antibiotic in a T75 flask and 60 mm cell culture dishes. Cell pellets were isolated from the 60 mm dishes and dissolved in 150 μL of phosphate-buffered saline (PBS).

The sample solution containing whole cells was added to cryo-vials containing either 20 mg or 50 mg of the matrix.

Similarly, the second experimental condition, RNA was isolated from the cell lines and preserved using the matrix. For this experimental condition, RLT lysis buffer was added to cells in 60 mm dishes. RNA was then isolated using Qiagen® RNeasy® Mini kit. RNA was eluted in 50 μL of DI water. The sample solution was added to cryo-vials containing either 20 mg or 50 mg of the matrix.

The matrix was made from a composition that contained 0.025M dextranol; 1.2 M trehalose; 1% (w/v) polyethylene glycol (PEG), M.W. 8000; 0.1% (v/v) Tween® 20; 0.3% (w/v) glutamic acid; 0.2% (w/v) glutamine; and 1.5% (v/v) glycerol.

The cryo-vials containing the whole cells or the isolated RNA were then added to vacuum chamber containing desiccants and dried for approximately 24 hours prior to short-term storage studies. The whole cells here were vitrified using the matrix, and RNA from these samples was extracted at the appropriate time points shown in tables below.

The positive control for both conditions included freezing the isolated RNA in a freezer at −80° C., and adding RLT Lysis buffer to the cells in 60 mm dishes and placing these dishes in a freezer at −80° C. The negative control was also included for the isolated RNA condition, where the isolated RNA was stored at room temperature.

The samples were stored in appropriate conditions, either at room temperature (20° C.) or in the freezer at −80° C. For the different experimental conditions, RNA quality, measured by RNA integrity number (RIN), was evaluated at different time points. RIN ranges from 1 (highly degraded RNA) to 10 (highly intact RNA). The evaluation was achieved using services provided by University of Minnesota Genomics Center (UMNGC). The samples stored with 50 mg of fibers were evaluated at 0 days, 3 days, and 7 days. The samples stored with 20 mg of fibers were evaluated at 3 days, 7 days, 14 days, and 28 days. The data from the experiments, one with 50 mg of fibers and other with 20 mg of fibers, is shown in TABLES 3A and 3B, respectively.

TABLE 3A

Short-term RNA stability, RIN; 50 mg of fibers

| Storage Time (Days) | Isolated RNA frozen and stored at −80° C. | Isolated RNA vitrified and stored at 20° C. | Isolated RNA stored at 20° C. | RNA from cells frozen and stored at −80° C. | RNA from cells vitrified and stored at 20° C. |
|---|---|---|---|---|---|
| 0 | 10 | 9.6 | — | 10 | 9.6 |
| 3 | 10 | 7.3 | 10 | 10 | 10 |
| 7 | 10 | 9.4 | 9.7 | 10 | 9.6 |

TABLE 3B

Short-term RNA stability, RIN; 20 mg of fibers

| Storage Time (Days) | Isolated RNA frozen and stored at −80° C. | Isolated RNA vitrified and stored at 20° C. | Isolated RNA stored at 20° C. | RNA from cells frozen and stored at −80° C. | RNA from cells vitrified and stored at 20° C. |
|---|---|---|---|---|---|
| 3 | 10 | 8.9 | 9.9 | 10 | 8.6 |
| 7 | 10 | 8.7 | 9 | 9.8 | 8.2 |
| 14 | 9.9 | 8.8 | 8.3 | 9.7 | 7.9 |
| 28 | 9.9 | 8.1 | 6.6 | 10 | 8.9 |

With samples stored with 50 mg of fibers, RNA seems to be highly intact after a week of storage using the matrix. This is evident from the RIN of 9.4 for RNA isolated from cells and vitrified using the matrix and stored at 20° C., and RIN of 9.6 from RNA isolated from vitrified cells which were stored at 20° C. for a week. With samples stored with 20 mg of fibers, the experiment was conducted for longer duration, up to 28 days. After almost a month of storage at 20° C., RNA remained of high quality with RIN of 8.1 and 8.8 from vitrified isolated RNA and RNA isolated from vitrified cells, respectively. High quality RNA is needed for downstream experiments such as RNA sequencing. For these experiments, RIN value of 8 is required to obtain meaningful results. These experiments show that the matrix allows for room temperature storage of nucleic acids, particularly RNA, for storage of at least 28 days.

Example 8

The impact of the vitrification protocol on the cells and the ability of the samples being used for another downstream application, e.g., quantitative-PCR, was tested. For these experiments, MDA-MB-231 cells lines were used. Cells were grown in 60 mm dishes using high glucose media in 10% FBS and 1% antibiotic.

Samples were stored either vitrified or frozen. For the vitrified samples, cell pellets were isolated and dissolved in PBS. These were then added to cryo-vials containing 50 mg of the matrix and vacuum dried for 24 hours in vacuum chamber containing desiccants. The matrix was as in Example 7. For the frozen samples, RLT Lysis buffer was added to the cells in the 60 mm dishes and stored at −80° C. for 24 hours. For the control, RLT Lysis buffer was added to the control cells in the 60 mm dishes and RNA was isolated immediately.

RNA was isolated using RNeasy Mini Kit (available from Qiagen in Hilden, Germany) and cDNA was synthesized using iScript™ Reverse Transcriptase Supermix (available from BIO-RAD Laboratories, Inc. in Hercules, CA) using the manufacturer's protocol. cDNA was then used to conduct quantitative polymerase chain reaction (q-PCR). The 1-PCR testing was used to determine feasibility of the and method the impact of freezing and vitrification on the cells. A q-PCR value that shows that the matrix does not interfere with the process indicates feasibility of the method. A Ct (threshold cycle) value indicates the number of cycles it takes for the amplified RNA to reach the threshold. The q-PCR results shown in TABLE 4 represent Log 2 fold change in Ct values. The values were analyzed using a "delta delta Ct" method, in which they are first normalized against a "housekeeping gene," in this case GAPDH, and then normalized against the control sample. The control samples, which are normalized against themselves, receive a value $2^{\wedge}(\text{negative } 0)=1$. For fold-change values less than 1, the time to reach the threshold was greater than the control, and there was decreased presence of that gene. For values greater than 1, the time to reach the threshold was less than the control. A q-PCR value shows that RNA can be amplified using PCR and can be detected from the sample. The range of q-PCR values for these genes can be anywhere between 0.1-40. The closer the q-PCR values of the frozen and vitrified samples are to 1, the better the sample is interpreted to have survived during storage.

Various genes relevant to different processes in the cell cycle, such as growth, proliferation, and apoptosis, were tested. For example, CDK2, CCND1, and CCNE1 are relevant to growth and proliferation; Casp3 and Casp9 are relevant to apoptosis; HSP70 and 90 are relevant to a response to stress, specifically temperature related, and can be modulated in oxidative and osmotic stress; PCNA, XRCC1, ATM are relevant to DNA damage and repair; PI3K, AKT, and BCL2 are part of mTorr process which is a pathway regulated by oxidative stress; BCL2 may also be used to study the effect of apoptosis. The tested genes as well as the results are shown in TABLE 4.

TABLE 4

Gene comparison for different methods of preservation

| | PI3K | AKT | BCL2 | HSP70 | HSP90 | Casp3 | Casp9 | CDK2 | CCND1 | CCNE1 | XRCC1 | ATM | PCNA |
|---|---|---|---|---|---|---|---|---|---|---|---|---|---|
| Control | 1.00 | 1.00 | 1.00 | 1.00 | 1.00 | 1.00 | 1.00 | 1.00 | 1.00 | 1.00 | 1.00 | 1.00 | 1.00 |
| Frozen | 0.92 | 0.84 | 0.57 | 0.88 | 1.08 | 0.82 | 0.85 | 0.74 | 0.63 | 0.85 | 0.83 | 0.63 | 0.94 |
| Vitrified | 0.71 | 0.74 | 0.65 | 0.68 | 0.80 | 0.83 | 0.64 | 0.57 | 0.78 | 0.84 | 0.71 | 0.58 | 0.42 |

The experiment showed that the matrix can be used to preserve whole cells, and the preserved cells can still be used for downstream experiments without resulting in severe changes in cell behavior as evidenced by the results above.

The complete disclosure of all patents, patent applications, publications, and electronically available material cited herein are incorporated by reference in their entirety. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. All headings are for the convenience of the reader and should not be used to limit the meaning of the text that follows the heading, unless so specified.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

The invention claimed is:

1. A lyoprotectant matrix comprising:
   a non-woven web of fibers comprising:
      a non-reducing polysaccharide comprising dextranol; and
      a non-reducing mono- or disaccharide,
      the fibers having an average diameter of 0.1 µm to 2.5 µm.

2. The lyoprotectant matrix of claim 1, wherein the non-reducing mono- or disaccharide comprises trehalose.

3. The lyoprotectant matrix of claim 1, wherein all carbohydrates in the lyoprotectant matrix are non-reducing sugars.

4. The lyoprotectant matrix of claim 1, wherein the lyoprotectant matrix is free of or substantially free of reducing sugars.

5. The lyoprotectant matrix of claim 1, wherein the lyoprotectant matrix is free of or substantially free of dextran.

6. The lyoprotectant matrix of claim 1, wherein the lyoprotectant matrix is free of or substantially free of compounds comprising aldehyde and ketone groups.

7. The lyoprotectant matrix of claim 1, wherein the lyoprotectant matrix further comprises one or more excipients.

8. The lyoprotectant matrix of claim 7, wherein the excipient increases lyoprotection of at least one biomarker of interest.

9. The lyoprotectant matrix of claim 7, wherein the excipient comprises an amino acid, an antioxidant, a polymer, a carbohydrate, or a bulking agent.

10. The lyoprotectant matrix of claim 7, wherein the excipient comprises glycerol, polyethylene glycol (PEG), polysorbate 20, gluconic acid, or glucamine.

11. The lyoprotectant matrix of claim 1, wherein the dextranol has a concentration of from 0.1 g/mL to 5 g/mL.

12. A method of storing a liquid biospecimen, the method comprising:
   mixing the liquid biospecimen with a lyoprotectant composition comprising a non-reducing polysaccharide to prepare a specimen-loaded composition, the non-reducing polysaccharide comprising dextranol;
   drying the specimen-loaded composition; and
   storing the dried specimen-loaded composition.

13. The method of claim 12, wherein the liquid biospecimen comprises a purified protein.

14. The method of claim 12, wherein the liquid biospecimen comprises an enzyme.

15. The method of claim 12, wherein the liquid biospecimen comprises whole blood, serum, saliva, or urine.

16. The method of claim 12, wherein the storing comprises storing at a temperature of 4° C. or greater.

17. The method of claim 12, wherein the storing comprises storing at a temperature of 22° C. or greater.

18. The method of claim 12, wherein the storing comprises storing for a time period of one week or greater.

19. The method of claim 12, wherein the storing comprises storing for a time period of two weeks or greater.

20. The method of claim 12, the method further comprising transporting the dried specimen-loaded composition.

* * * * *